(12) United States Patent
Roberts et al.

(10) Patent No.: US 11,028,817 B2
(45) Date of Patent: Jun. 8, 2021

(54) BIDIRECTIONAL SYSTEM AND APPARATUS FOR GENERATING POWER

(71) Applicant: VerdErg Renewable Energy Limited, Surrey (GB)

(72) Inventors: Peter Roberts, Surrey (GB); Robert Kettle, Surrey (GB)

(73) Assignee: VERDERG RENEWABLE ENERGY LIMITED, Surrey (GB)

( * ) Notice: Subject to any disclaimer, the term of this patent is extended or adjusted under 35 U.S.C. 154(b) by 18 days.

(21) Appl. No.: 16/324,103

(22) PCT Filed: Aug. 9, 2017

(86) PCT No.: PCT/GB2017/052344
§ 371 (c)(1),
(2) Date: Feb. 7, 2019

(87) PCT Pub. No.: WO2018/029467
PCT Pub. Date: Feb. 15, 2018

(65) Prior Publication Data
US 2019/0170110 A1 Jun. 6, 2019

(30) Foreign Application Priority Data
Aug. 10, 2016 (GB) ..................... 1613764

(51) Int. Cl.
*F03B 13/10* (2006.01)
*F03B 13/26* (2006.01)
*F03B 17/06* (2006.01)

(52) U.S. Cl.
CPC ............ *F03B 13/10* (2013.01); *F03B 13/264* (2013.01); *F03B 17/06* (2013.01); *F05B 2240/133* (2013.01); *Y02E 10/20* (2013.01)

(58) Field of Classification Search
CPC ........ F03B 13/10; F03B 13/264; F03B 17/06; Y02E 10/28; F05B 2240/133
(Continued)

(56) References Cited

U.S. PATENT DOCUMENTS

2007/0257493 A1* 11/2007 Alstot ................ F03B 17/06
290/54
2009/0146435 A1* 6/2009 Freda ................. F03D 9/25
290/55
(Continued)

FOREIGN PATENT DOCUMENTS

CN 105332849 A 2/2016
DE 10 2005 040 805 A1 3/2007
(Continued)

*Primary Examiner* — Charles Reid, Jr.
(74) *Attorney, Agent, or Firm* — Seed Intellectual Property Law Group LLP

(57) ABSTRACT

An apparatus for generating electricity from a bidirectional water flow, such as tidal flow, includes a base structure, a primary flow pipe defining a first flow passage through the base structure, and a secondary flow pipe defining a second flow passage through the base structure. The primary flow pipe includes a convergent section a mixing chamber, the convergent section connected to a first end of the mixing chamber to define a venturi therebetween, and a diffuser section connected to a second end of the mixing chamber. The apparatus further includes an opening in the secondary flow pipe to provide fluidic communication between the second flow passage and the mixing chamber, a turbine connectable to a generator and arranged to be rotated by water flow from the second flow passage, and a control mechanism for directing the water flow from the second flow passage through the opening into the mixing chamber.

25 Claims, 17 Drawing Sheets

(58) Field of Classification Search
USPC .................................................. 290/43, 54
See application file for complete search history.

(56) References Cited

U.S. PATENT DOCUMENTS

| | | | | |
|---|---|---|---|---|
| 2010/0158705 A1* | 6/2010 | Guinard | ................ | F03B 17/061 |
| | | | | 417/53 |
| 2010/0237620 A1* | 9/2010 | West | ....................... | F03D 15/10 |
| | | | | 290/52 |
| 2010/0259048 A1* | 10/2010 | Smith | ..................... | F03B 13/10 |
| | | | | 290/54 |
| 2013/0069369 A1* | 3/2013 | Salehpoor | ............. | F03B 13/264 |
| | | | | 290/53 |
| 2013/0113216 A1* | 5/2013 | Shrosbree | ................ | F03D 1/00 |
| | | | | 290/54 |
| 2013/0334824 A1* | 12/2013 | Freda | ..................... | F03D 13/20 |
| | | | | 290/55 |
| 2015/0030430 A1* | 1/2015 | Hon | ..................... | F03B 17/061 |
| | | | | 415/1 |
| 2016/0061183 A1* | 3/2016 | Orij | ........................ | F03B 15/18 |
| | | | | 415/141 |
| 2017/0184069 A1* | 6/2017 | Roberts | ................... | F03B 13/08 |

FOREIGN PATENT DOCUMENTS

| | | |
|---|---|---|
| EP | 3 023 632 A1 | 5/2016 |
| FR | 1.055.437 A | 2/1954 |
| GB | 2503250 A | 12/2013 |
| GB | 2521876 A | 7/2015 |
| JP | 2007-9833 A | 1/2007 |
| RU | 2 592 953 C1 | 7/2016 |
| WO | 2011/114155 A2 | 9/2011 |

* cited by examiner

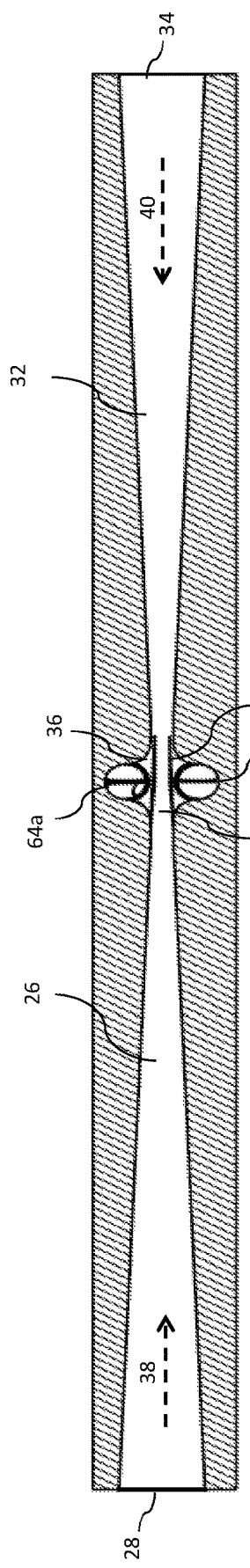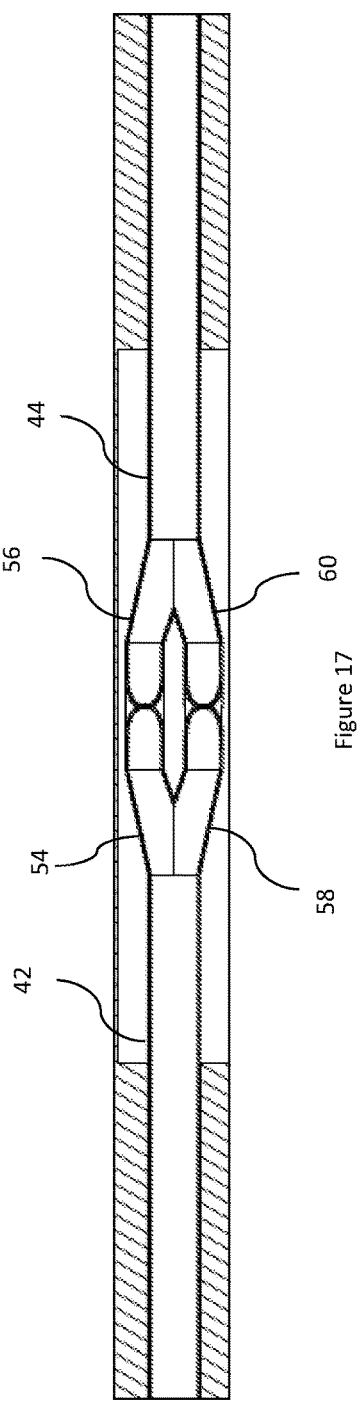

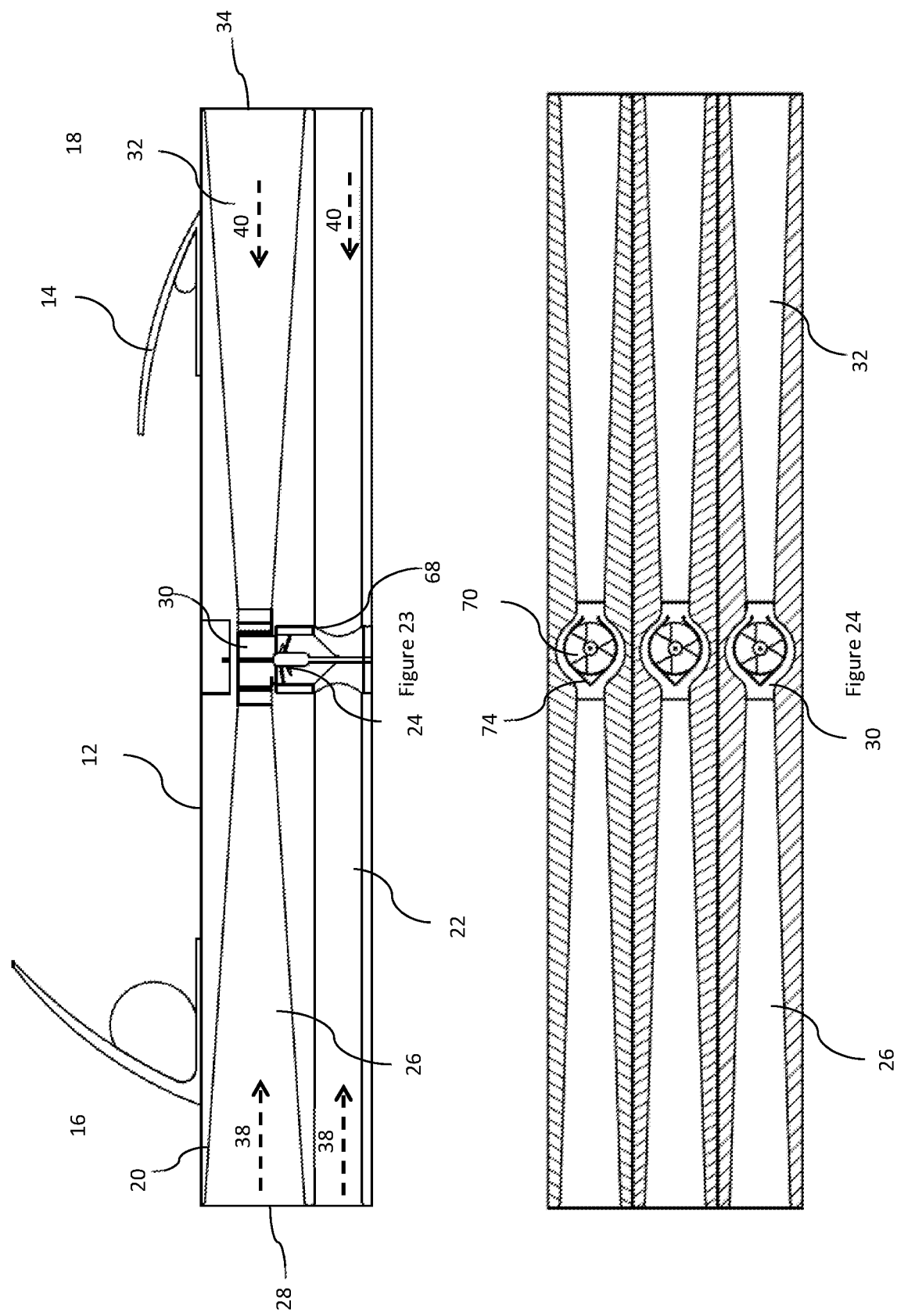

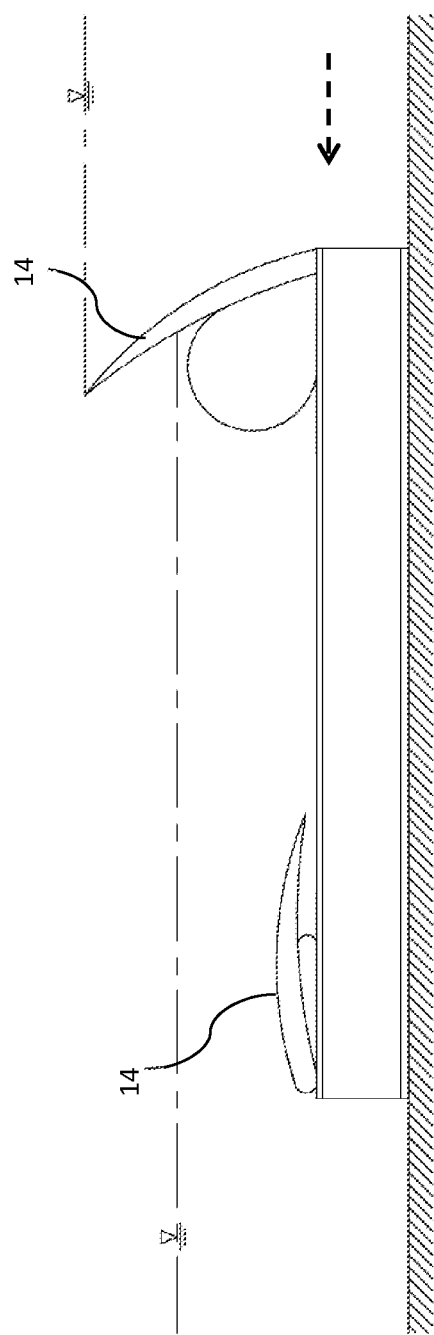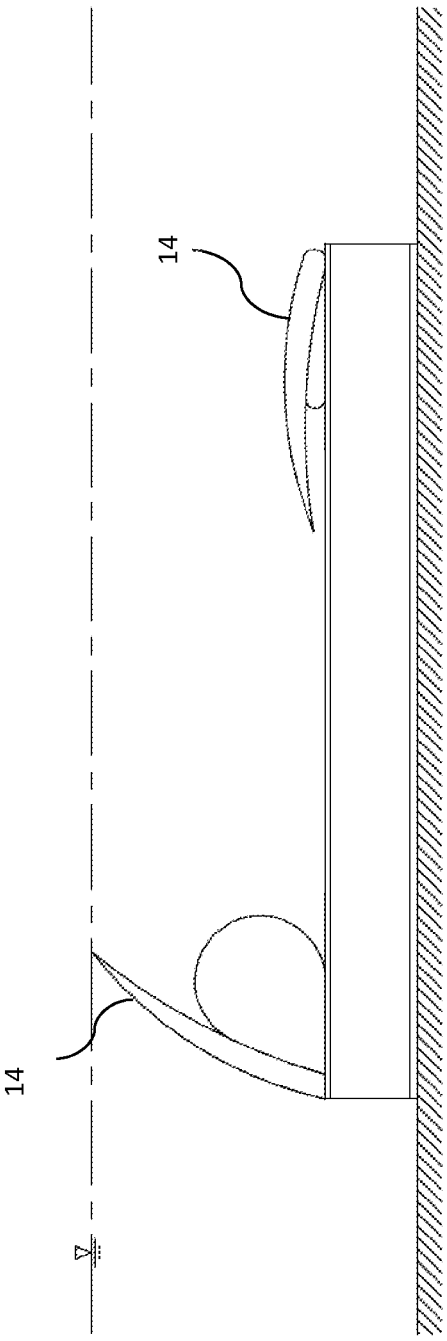

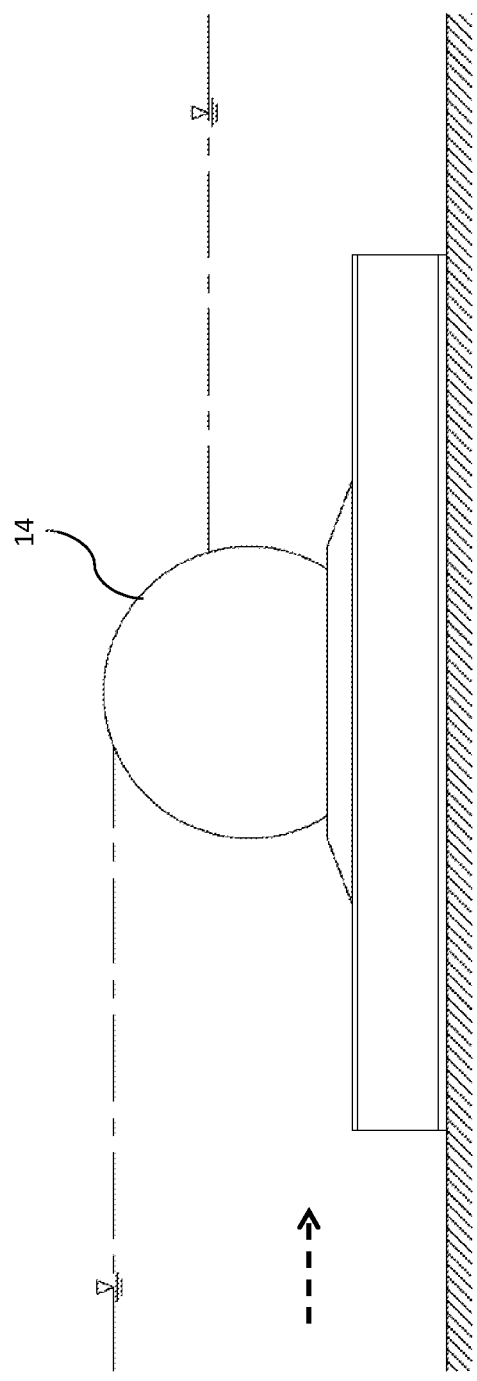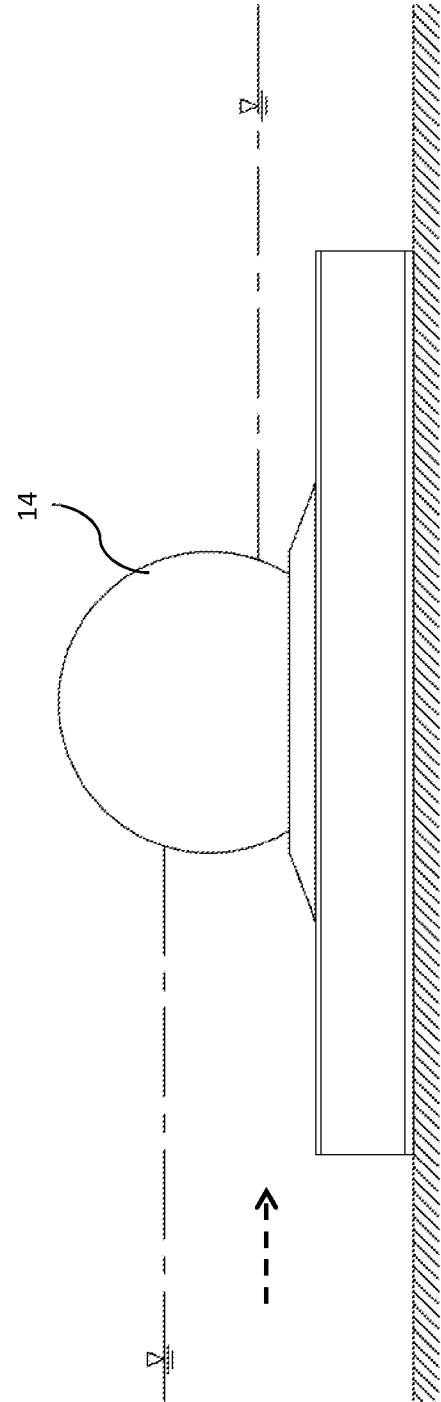

BIDIRECTIONAL SYSTEM AND APPARATUS FOR GENERATING POWER

BACKGROUND

Technical Field

Some embodiments of the invention relate to systems and apparatuses for generating power from the movement of a body of water. In particular, some embodiments of the invention relate to a bidirectional apparatus for generating power from water flow such as tidal estuary, tidal lagoon or tidal river flow, collectively known herein as "Tidal Flow".

Description of the Related Art

Various systems have been proposed for generating power from water flows.

Some systems require dams, barrages, or other artificial structures, to block the flow of water across a body of water, and create a head of water behind the barrage. Once the head of water is of sufficient height the stored water is released to flow through turbines to generate electrical power, thus converting the potential energy stored in the water into useful power. These are sometimes referred to as "Tidal Head" or "Tidal Range" devices.

Other systems have focused on developing bidirectional turbines that can be directly placed in the flow of water and which can operate in both ebb and flood tides. These turbines may be used with tidal barrages or run in free stream environments. However there can be problems with the efficiency of turbines designed to work in flow coming from different directions.

BRIEF SUMMARY

Some embodiments of present invention provide an alternative bidirectional system that can be used to produce electricity from tidal flows in both directions.

Some embodiments of the invention generally reside in a bidirectional apparatus for use in generating electricity from tidal flows of water.

Accordingly, a first aspect of some embodiments of the invention comprises an apparatus for generating electricity from a tidal water flow comprising:
- a base structure;
- a primary flow pipe defining a first flow passage through the base structure;
- a secondary flow pipe defining a second flow passage through the base structure;
- the primary flow pipe comprising:
- a convergent section;
- a mixing chamber, the convergent section being connected to a first end of the mixing chamber to define a venturi therebetween; and
- a diffuser section connected to a second end of the mixing chamber;
- the apparatus further comprising:
- an opening in the length of the secondary flow pipe arranged to provide fluid communication between the second flow passage and the mixing chamber;
- a turbine connectable to a generator and arranged to be rotated by water flow from the second flow passage; and,
- a control mechanism for directing the water flow from the second flow passage through the opening into the mixing chamber, wherein water flowing from a first direction flows into the mixing chamber from one end of the base structure and water flowing from a second direction flows into the mixing chamber from the opposite end of the base structure.

The first and second flow passages are configured for bidirectional flow. The apparatus can work as a bidirectional device, able to generate electricity from a body of water that can flow in opposite directions. This minimizes down time when electricity can be generated from a tidal flow of water. Electricity can be generated during both ebb and flood tides.

In use when water is flowing in a first direction water can flow into the mixing chamber from a first end of the base structure and be prevented from flowing out of the secondary flow passage at the second end of the base structure. When water is flowing in a second direction water can flow into the mixing chamber from the second end of the base structure and can be prevented from flowing out the secondary flow pipe at the first end of the base structure.

During operation, there is fluidic communication between a first flow passage and a second flow passage. The primary and secondary flow pipes are configured such that in use water from a first flow passage and a second flow passage can combine in the mixing chamber of the primary flow pipe, and flow out of the primary flow pipe.

The apparatus preferably comprises a plurality of primary flow pipes and a plurality of secondary flow pipes, wherein each primary flow pipe is located adjacent at least one secondary flow pipe. The number of primary and secondary flow pipes will depend on the size of the apparatus and/or the size of the body in which the apparatus is to be used. Each primary flow pipe connected to at least one secondary flow pipe, and each primary flow pipe/secondary flow pipe arrangement having at least one turbine. In one embodiment each primary flow pipe is in fluidic communication with two secondary flow pipes. Alternatively, each primary flow pipe can be in fluidic communication with one secondary flow pipe.

The pipes extend horizontally through the base structure each pipe having a first opening at a first end of the base structure and a second opening at the second end of the base structure. When a tidal flow is in a first direction the first opening will be the intake end and the second opening of the primary flow pipe will be the output end. When a tidal flow is in the second direction the second opening will be the intake end and the first opening of the primary flow pipe will be the output end.

The convergent section narrows from the first opening at one end of the pipe to a first end of the mixing chamber. The diffuser section is a second convergent section and narrows from the second opening at the second end of the pipe to the second end of the mixing chamber.

Both the first and second convergent sections are configured as diffusers such that when water flows through the pipes in a first direction the second convergent acts as the diffuser section, and when the water flows through the pipes in a second direction the first convergent section acts as the diffuser section. The diffuser sections decrease the velocity of the water flowing out the pipe.

A primary flow pipe and a secondary flow pipe are connected to each other via respective openings along their length, such that fluid can flow from the secondary flow pipe into the primary flow pipe.

The mixing chamber can have at least one opening along its length. The mixing chamber is in fluid communication with a secondary flow pipe via the opening. As such each primary flow pipe can have at least three openings. End openings at each end of the primary flow pipe to receive water from the water tidal flow and at least one opening along the length of the mixing chamber of the primary flow pipe to enable fluid communication with the secondary flow pipe.

In some embodiments each primary flow pipe can have four openings. The mixing chamber can have two openings, each opening of the mixing chamber enabling fluid communication with the same secondary flow pipe or each mixing chamber opening enabling fluid communication with a different secondary flow pipe.

The secondary flow pipes can have at least one opening along its length to enable it to be in fluid communication with the mixing chamber of the primary flow pipe. As such, each secondary flow pipe has at least three openings. End openings at each end of the secondary flow pipe to receive water from the water tidal flow and at least one opening along the length of the secondary flow pipe to enable fluid communication with the primary flow pipe. The opening to the primary flow pipe is located in the central section of the secondary flow pipe. In some embodiments the secondary flow pipe has four openings, the secondary flow pipe can have two openings along it length, each opening along the length of the secondary flow pipe enabling fluid communication with the same primary flow pipe or each opening along the length of the secondary flow pipe enabling fluid communication with a different primary flow pipe.

The control mechanism is a fluid control mechanism and controls the direction of the flow through the second flow passage. The fluid control mechanism can block the flow of water through the entire length of the second flow passage. The fluid control mechanism can control the direction of the water so that all the water entering the primary and secondary flow pipes discharges via the primary flow pipe.

The apparatus may comprise passive and/or active flow control mechanisms to control the direction of water flow through the device.

By passive mechanism it means that the secondary flow pipe is sized and shaped to prevent water being drawn from the downstream end of the secondary flow pipe. For example the diameter and/or cross-sectional area of the secondary flow pipe can be selected to provide a water velocity that will ensure no static pressure gradient exists along the secondary flow pipe. This can assist in preventing water flow being drawn up from the downstream end of the secondary flow pipe into the mixing chamber.

A physical flow control mechanism can be a moveable flow control mechanism that directs water flow from the second flow passage through the opening into the mixing chamber, the control mechanism can be moveable between a first position in which enables the water flow into the mixing chamber from the first end of the base structure, and a second positon in which water flows into the mixing chamber from the second end of the base structure.

In a first position the fluid control mechanism directs the water flows from one end of the second flow passage into the mixing chamber. In the first position the fluid control mechanism can block water entering the opposite end of the second flow passage. In a second position the fluid control mechanism directs the water flow from the opposite end of the second flow passage into the mixing chamber. In the second position the fluid control mechanism can block water entering the first end of the second flow passage.

In one embodiment a flow control mechanism may be a moveable baffle or a cylinder having a flow passage therethrough having an opening on one side at the lower end of the cylinder and an opening at the upper end on the opposite side of the cylinder.

The secondary flow pipes can be located to the side or above the primary flow pipes. Preferably the turbine is located in the secondary flow pipe. Each secondary flow pipe can comprise two turbines. The two turbines can be located at opposite ends of the pipes. In a further embodiment each primary flow pipe and secondary flow pipe arrangement comprises one turbine located in the second flow passage. Preferably the turbine is located in a manifold connecting one of primary flow pipes to one of the secondary flow pipes.

In one embodiment the secondary flow pipes are located to the sides of the primary flow pipes to form a horizontal array of primary and secondary flow pipes, and wherein each secondary flow pipe comprises two turbines, a first turbine located in a first end of the secondary flow pipe and a second turbine located in a second end of the secondary flow pipe. The turbines can rotate about a substantially horizontal axis.

The secondary flow pipe comprises a central section located between the first and second ends of the secondary flow pipe, wherein in the central section the secondary flow pipe divides into a first flow channel and a second flow channel, and wherein the first and second flow channels are in fluidic communication with the mixing chamber of a primary flow pipe.

In one embodiment the first flow channel and the second flow channel of each secondary flow pipe are in fluid communication with the same primary flow pipe.

The apparatus can comprise a first plenum chamber connecting the top of the mixing chamber to the first flow channel of a secondary flow pipe and a second plenum chamber connecting the bottom of the mixing chamber of each primary flow pipe to the second flow channel of the secondary flow pipe. Water enters the first plenum chamber from the first flow channel and then is discharged into the mixing chamber of the primary flow pipe. Water enters the second plenum chamber from the second flow channel and then is discharged into the mixing chamber of the same primary flow pipe.

A flow control mechanism controls the flow through the secondary flow pipe. The apparatus can comprise a passive flow control mechanism for directing water through the apparatus. The flow control mechanism can be structurally arranged such that there is no pressure gradient between each end of the secondary flow pipe. The diameter and/or cross-sectional area of the secondary flow pipe can be configured such that there is no static pressure gradient along the length of the secondary flow pipe and the plenum is configured to have a low pressure relative to the pressure at the downstream end of the pipe.

In one embodiment a flow control mechanism can be located in the secondary flow pipe and allow the flow of fluid in a first direction, i.e., into the primary flow pipe, and prevents the flow fluid in a second direction, i.e., continuing through the secondary flow pipe. The control mechanism can be a moveable baffle. The flow control baffle can comprise a channel to direct water from the secondary flow passage into the primary flow passage.

The mixing chamber may comprise moveable horizontal flow control baffles positioned to direct the flow of water from the plenum chambers into the mixing chamber.

In one embodiment the first flow channel and the second flow channel of each secondary flow pipe are in fluid communication with different primary flow pipes. The first flow channel directs water into a first primary flow pipe. The second flow channel directs water into a second primary flow pipe.

The first flow channel of a secondary flow pipe is configured to discharge water into the mixing chamber of a first primary flow pipe and the second flow channel of the secondary flow pipe is configured to discharge water into a second primary flow pipe. The first and second primary flow pipe can be located on opposite sides of the secondary flow pipe.

A flow control mechanism controls the flow through the secondary flow pipe. The flow control mechanism can be located in the secondary flow pipe and allows the flow of fluid in a first direction, i.e., into the primary flow pipe, and prevents the flow fluid in a second direction, i.e., continuing through the secondary flow pipe. The control mechanism can be a moveable baffle. The flow control baffle can comprise a channel to direct water from the secondary flow passage into the primary flow passage.

In one embodiment each secondary flow pipe is located below a primary flow pipe. A horizontal array of primary flow pipes is formed above a horizontal array of secondary flow pipes. Each primary flow pipe connected to a secondary flow pipe. Each primary flow pipe/secondary flow pipe arrangement comprises a turbine located in the secondary flow.

The apparatus further comprises a manifold connecting the secondary flow pipe to the primary flow pipe located above, wherein the turbine is located in the manifold. The turbine can rotate about a substantially vertical axis.

By locating the turbine in the manifold, electricity can be generated from bidirectional flow, such a tidal flow, using one turbine in the secondary flow path.

The primary flow pipe comprises a moveable plenum chamber in the mixing chamber, and wherein the flow from the secondary flow pipe is drawn into the plenum chamber via the manifold.

The moveable plenum chamber is located such that water flow through the primary flow pipe can flow around the sides of the plenum and having an opening in the direction of the flow, through which water from the secondary flow pipe is discharged to mix with the flow through the primary flow pipe.

The moveable plenum chamber is moveable between a first position, such that the opening of the plenum chamber is in a first direction of the flow, and a second position such that the opening of the plenum chamber is in a second direction of the flow.

The moveable plenum chamber is connected to the flow control mechanism such that movement of the flow control mechanism between its first and second position moves the plenum chamber between its first position and second position.

The control mechanism can be a moveable baffle. The flow control baffle can comprise a channel to direct water from the secondary flow passage into the primary flow passage.

In another embodiment the flow control mechanism can be in the form of a substantially cylindrical drum having opening on one side at its lower end and an opening on its other side at its upper end. The outlet opening in the cylindrical surface of the upper end can release water into the primary flow pipe and the inlet opening in the cylindrical surface of the lower end receives water from the secondary flow pipe.

A further aspect of some embodiments of the invention is a system for generating power from a bidirectional water flow comprising an apparatus as described above and at least one barrier located on the top of the base structure. The barriers extend across the base structure orthogonal to the central axis of the primary and secondary flow pipes.

Preferably the at least one barrier is a moveable barrier located on the top of the base structure, and wherein the moveable barrier is moveable between a first raised position and second lowered position.

Preferably the system comprises two moveable barriers, wherein the first moveable barrier is located at the first end of the base structure and the second moveable barrier is located at the opposite end of the base structure.

In the following description, the terms "upstream" and "downstream" are used to define relative locations of features of the apparatus. The upstream and downstream directions are defined in relation to the direction which the water flows through the apparatus in use. The upstream end can be considered the input region and the downstream end can be considered the output region.

BRIEF DESCRIPTION OF THE SEVERAL VIEWS OF THE DRAWINGS

Some embodiments of the invention will now be described by way of example with reference to the accompanying drawings:

FIGS. 14-17 show sectional views of the invention;
FIG. 23 shows a sectional side view of the invention;
FIG. 24 shows a sectional top view of the invention;
FIGS. 25*a-f* show schematic drawings of the use of an embodiment of the invention in a body of water having a tidal flow;
and
FIGS. 26*a-f* shows schematic drawings of the use of an embodiment of the invention in a body of water having a tidal flow.

DETAILED DESCRIPTION

Figure 1:
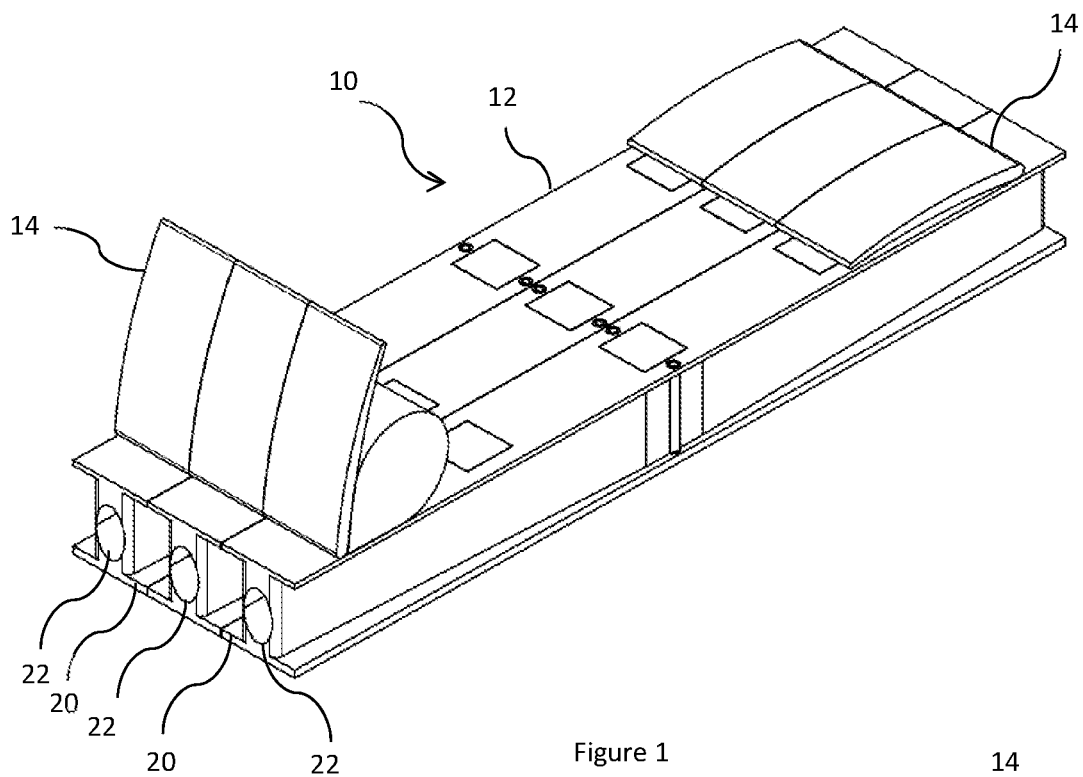
FIGS. 1 to 3 show schematic sectional views of the invention.

With reference to FIG. 1 a bidirectional system 10 according to some embodiments of the invention for converting a tidal water flow to electricity comprises a base structure 12 for positioning across the width of a body of water. Moveable barriers 14 are located on top of the base structure 12 to define an upstream side and a downstream side. In use the moveable barriers provides a head difference between the upstream and downstream sides of the barrier.

The base structure 12 comprises an array of pipes 20, 22 that provide flow passages for the water through the base structure and are configured for bidirectional water flow, and turbines 24 to generate power as water flows through the apparatus. Each secondary flow pipe is connected to at least one primary flow pipe such that water can flow from the secondary flow pipe into the primary flow pipe. The system creates a store of hydraulic potential energy, which is converted to electrical energy as it flows through the apparatus.

With reference to FIGS. 1-12 in a first embodiment of the invention the apparatus 10 comprises a base structure 12 having an array of primary flow pipes 20 and an array of secondary flow pipes 22. Each primary flow pipe is located in between two secondary flow pipes. The primary flow pipes provide a flow passage from the upstream side of the barrier to the downstream side of the barrier 14. The secondary flow pipe feeds a flow of water into the primary flow pipe. As shown in FIGS. 1-12 each primary flow pipe 20 is connected to two secondary flow pipes, such that water can flow from the secondary flow pipes into the primary flow pipe.

Both the primary and secondary flow pipes receive water from the body of water. The water exiting the primary flow pipes is a mixed flow of water that has entered the apparatus via both primary flow pipes and secondary flow pipes.

Figure 3:
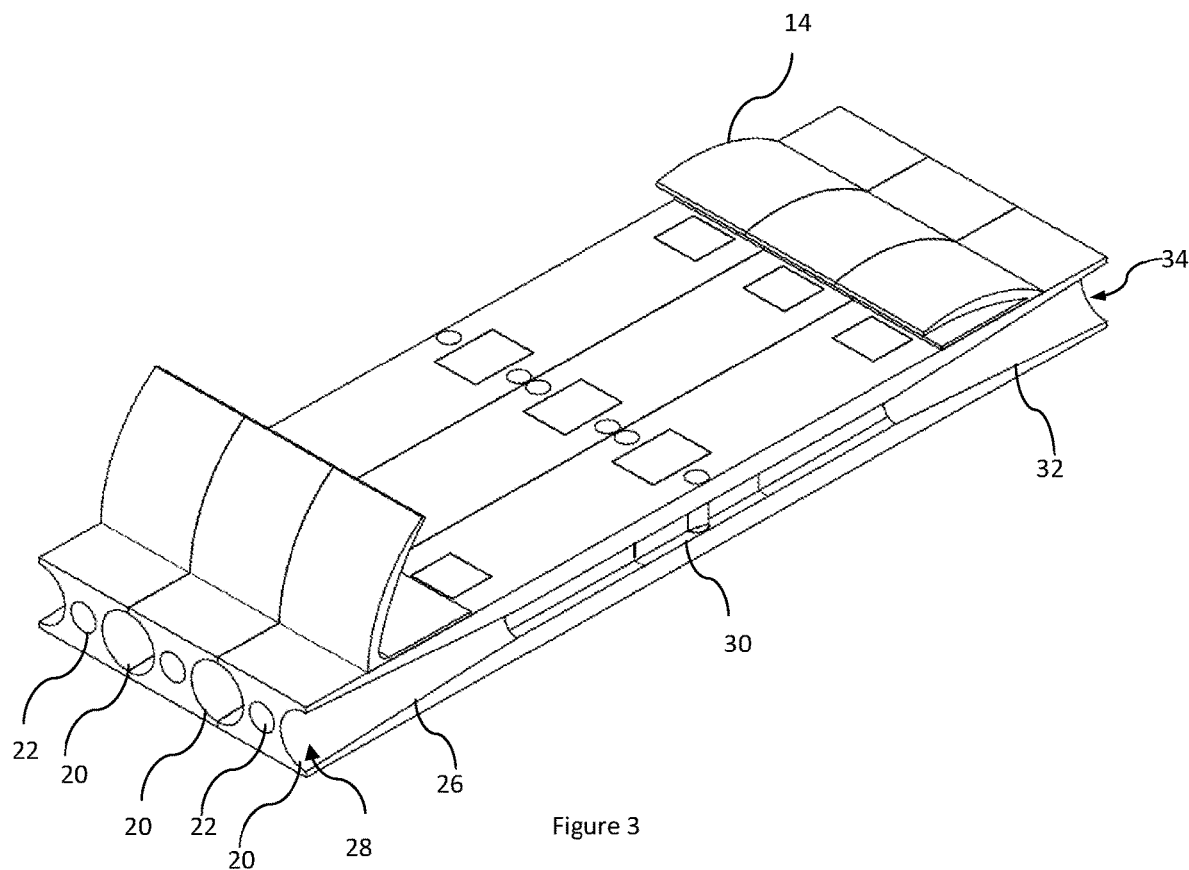
Figure 4:
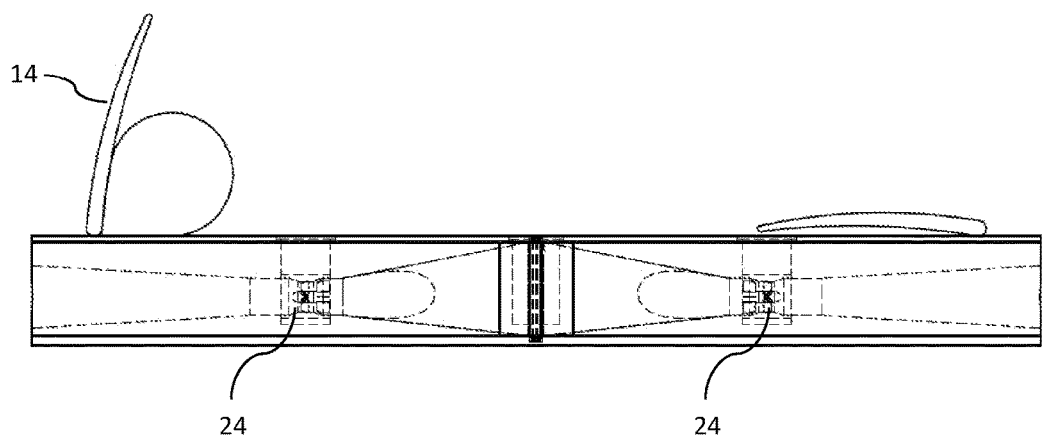
FIG. 4 shows a sectional view of the invention.
Figure 11:
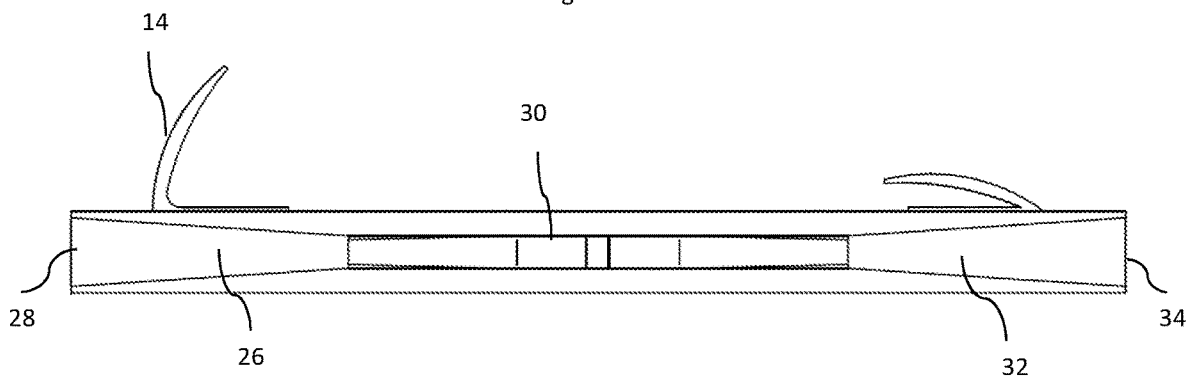
FIGS. 11 and 12 show sectional views of the invention.
Figure 12:
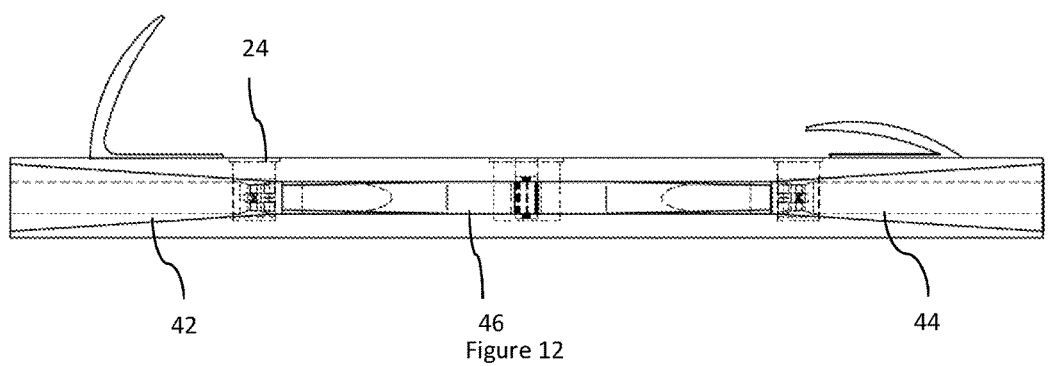
Figure 13:
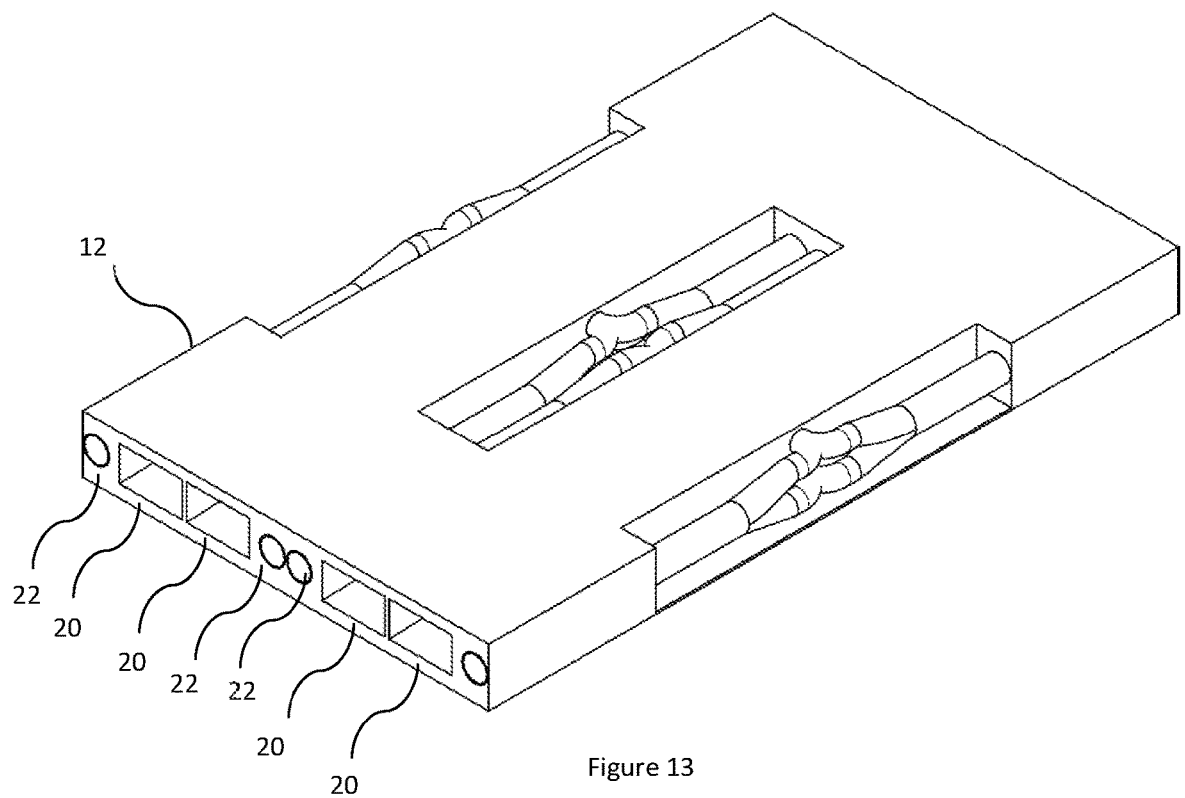
FIG. 13 shows a schematic view of the invention.
Figure 14:
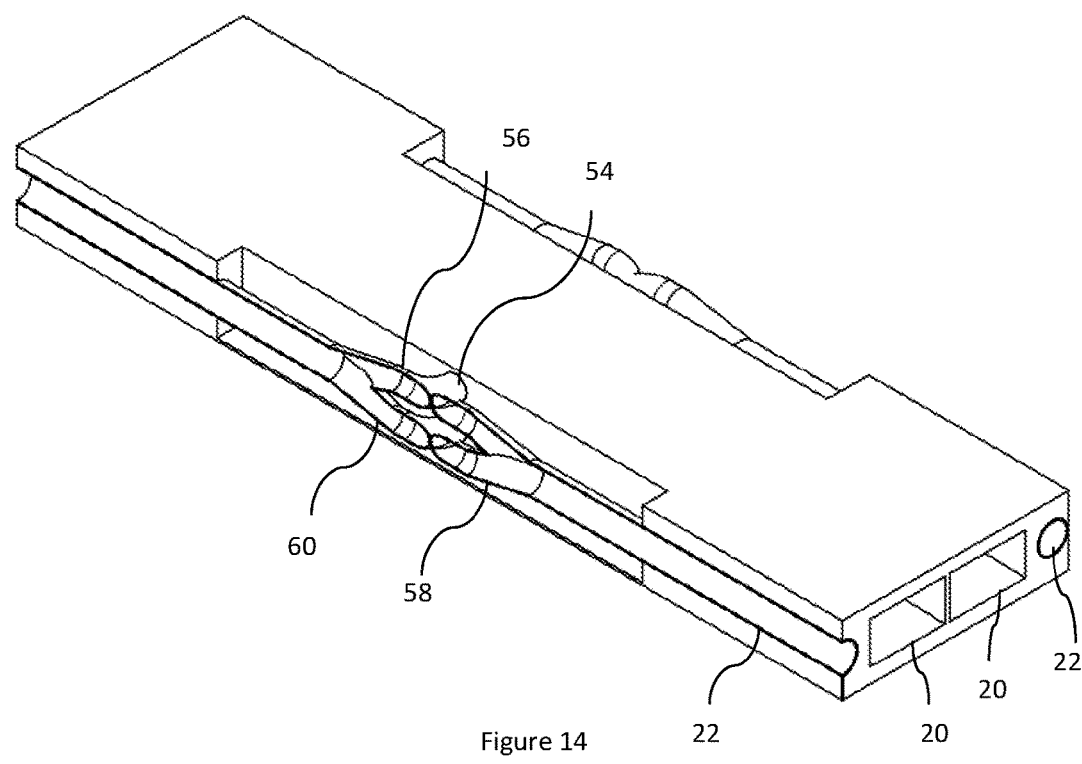
Figure 18:
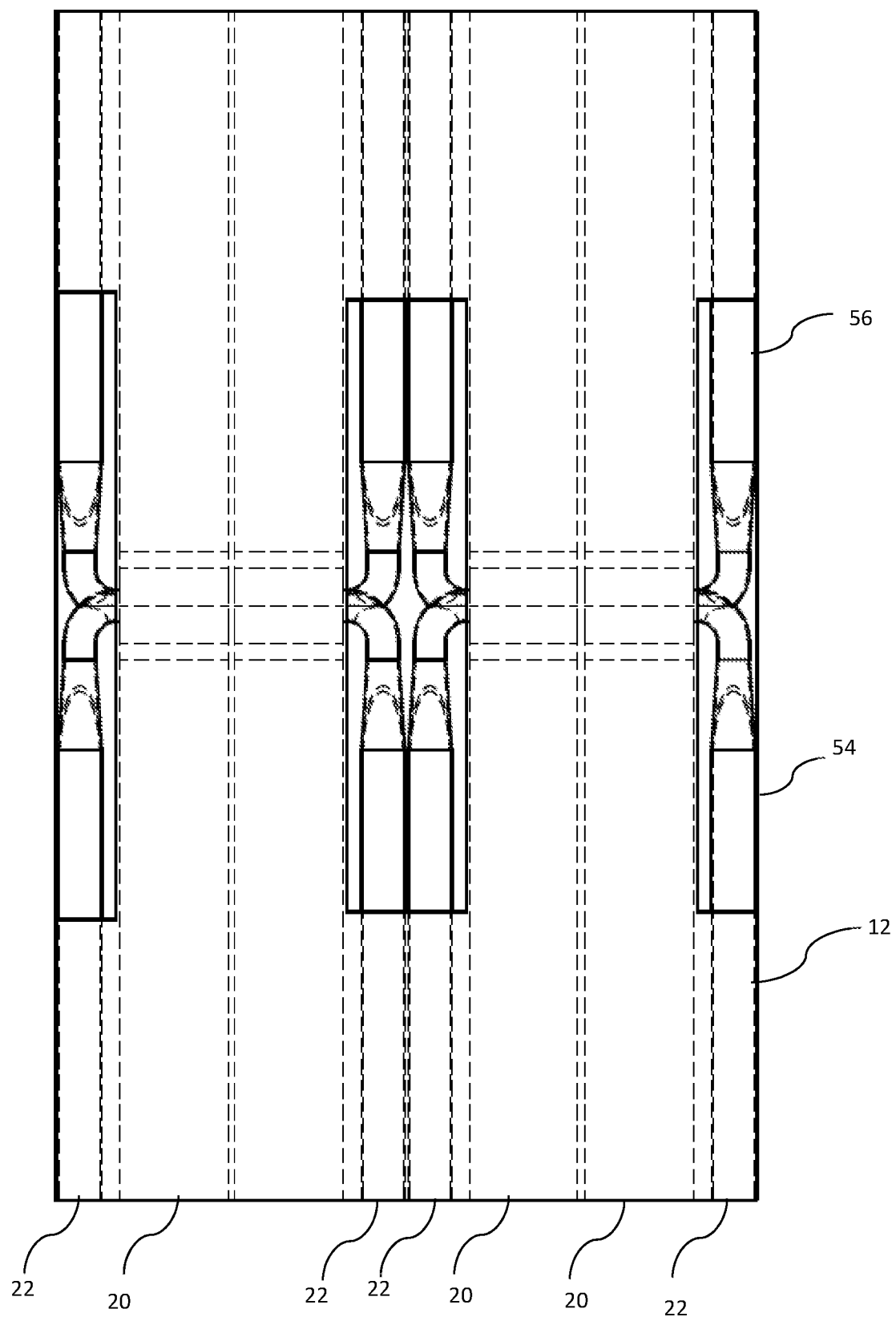
FIG. 18 shows a schematic top view of the invention.
Figure 19:
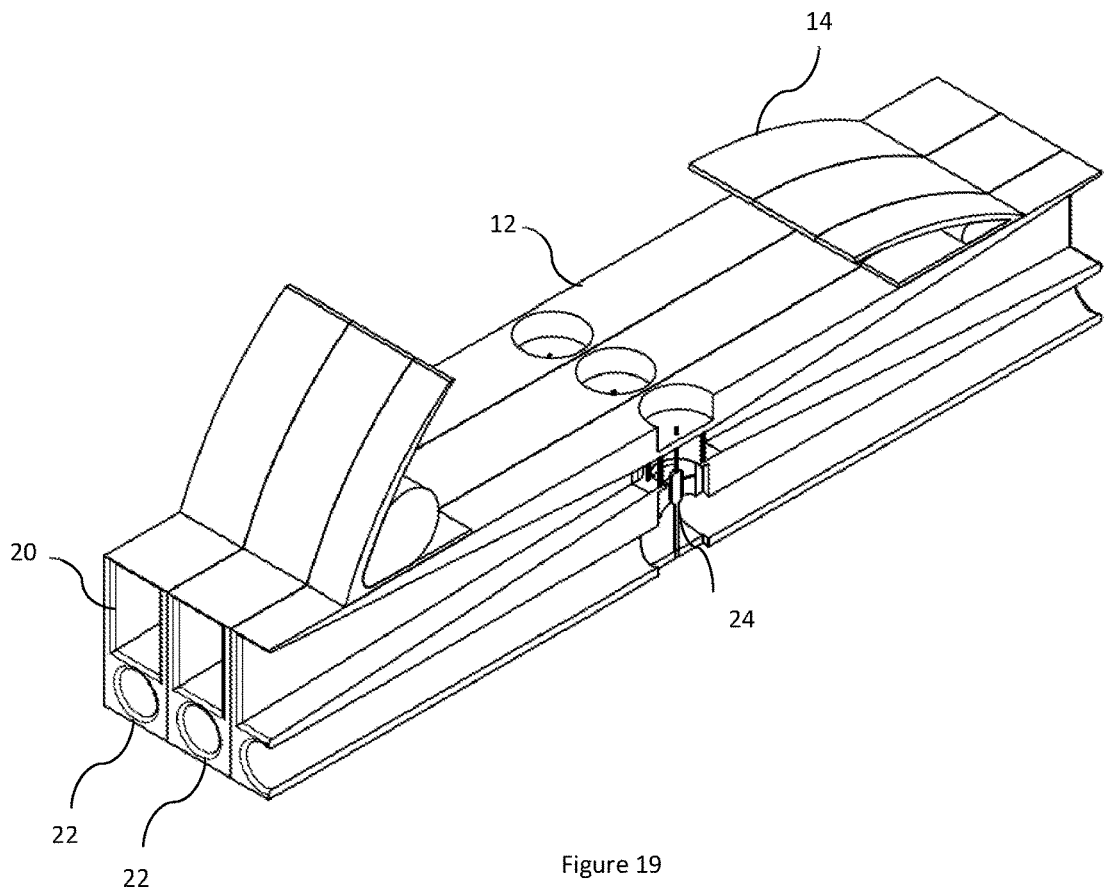
FIG. 19 shows a section view of the invention.
Figure 20:
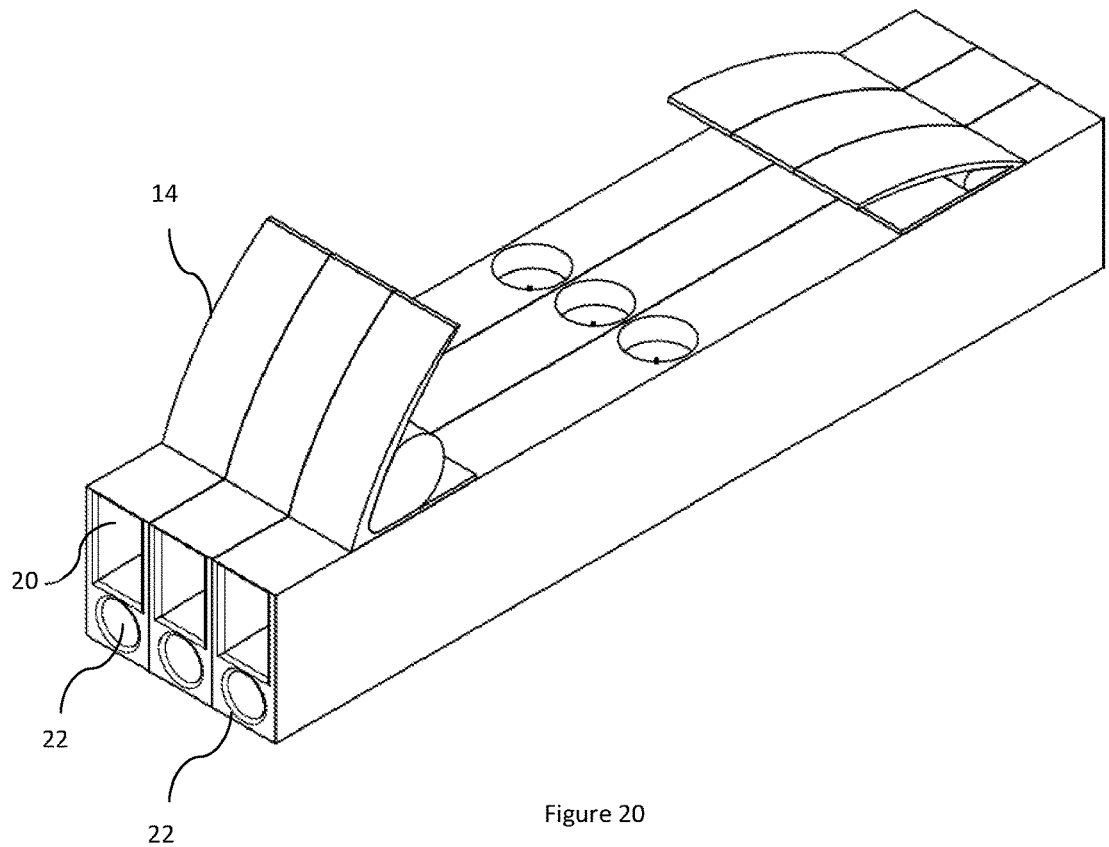
FIG. 20 shows a schematic view of the invention.
Figure 21:
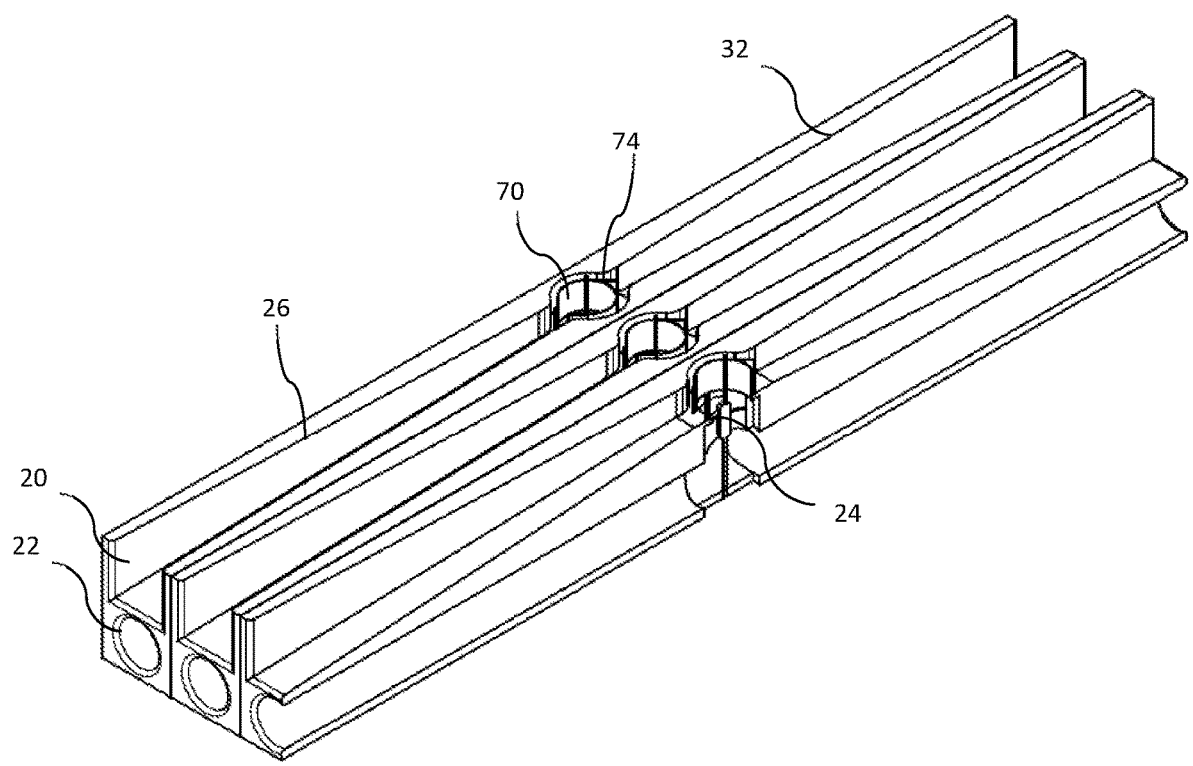
FIG. 21 shows a cut away view of the invention.
Figure 22:
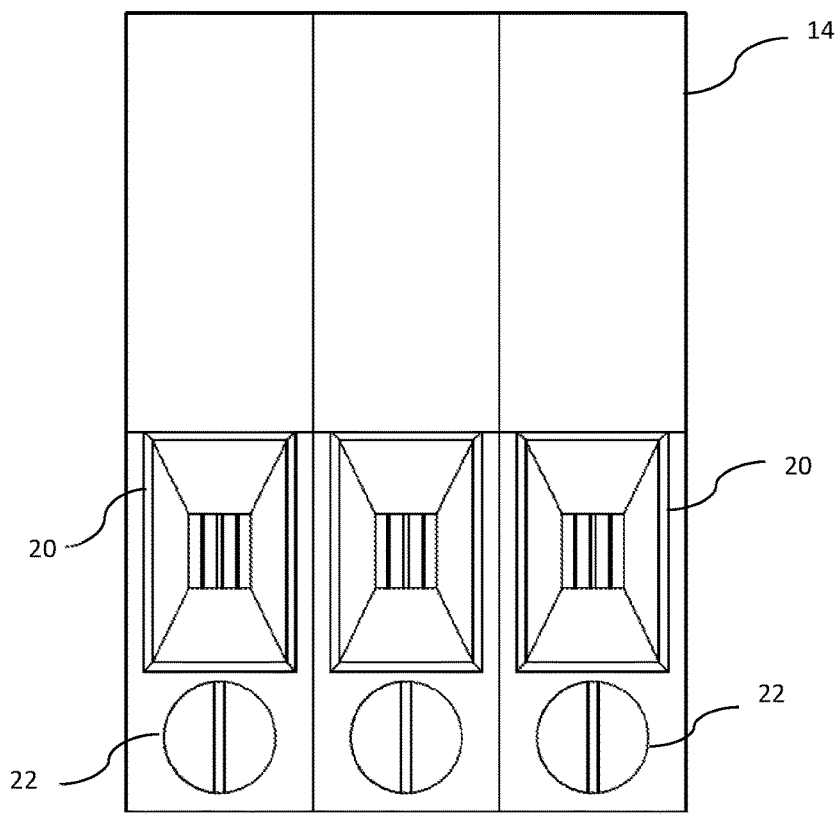
FIG. 22 shows a front view of the invention.
Figure 25A:
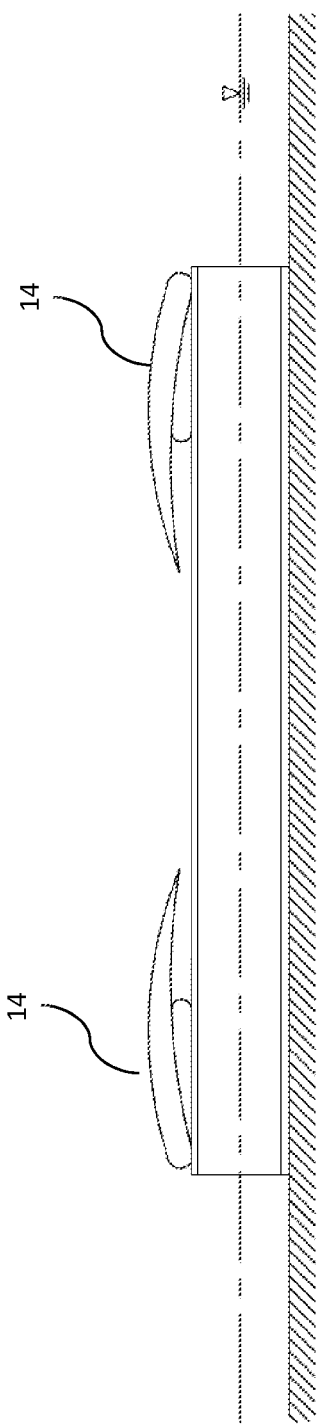
Figure 25B:
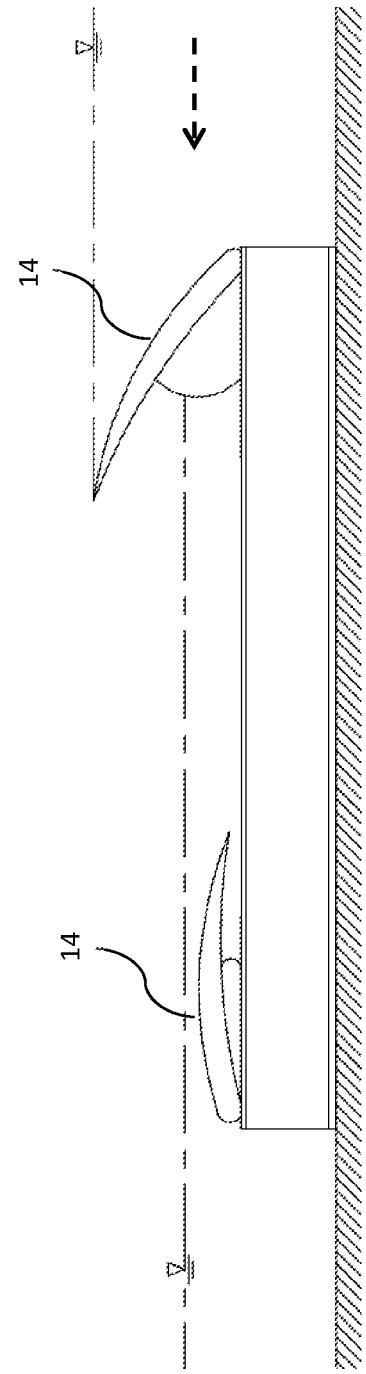
Figure 25E:
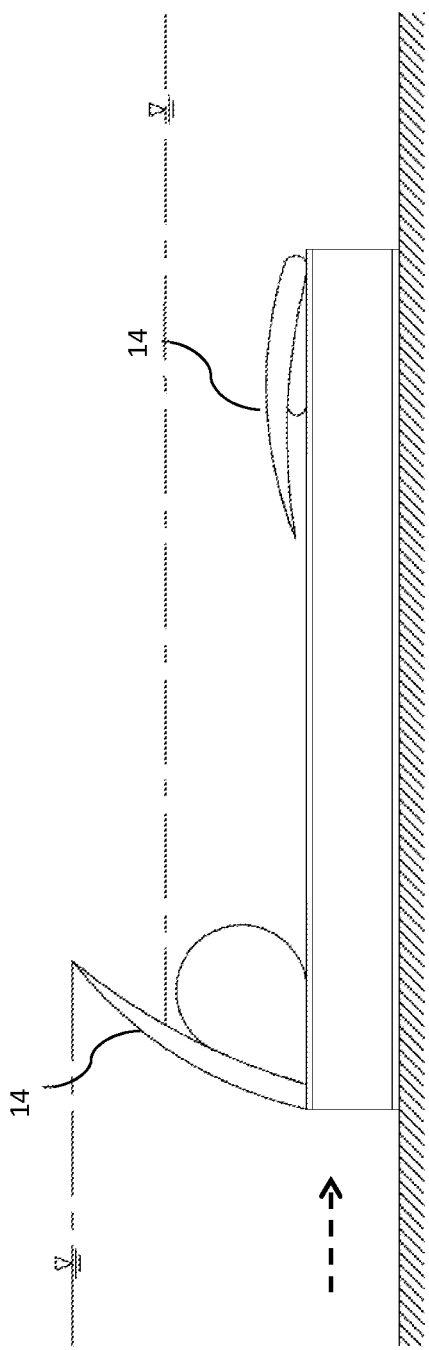
Figure 25F:
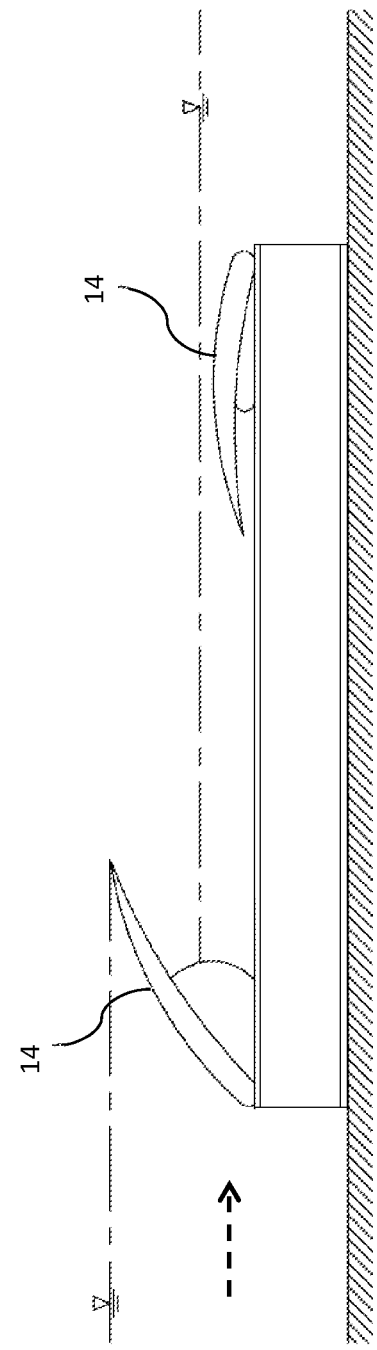
Figure 26A:
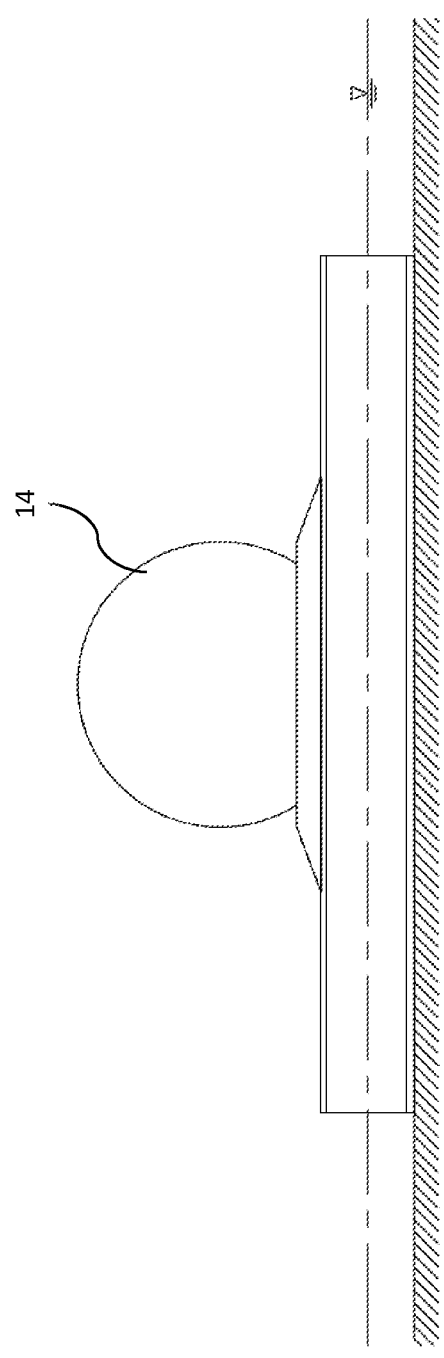
Figure 26B:
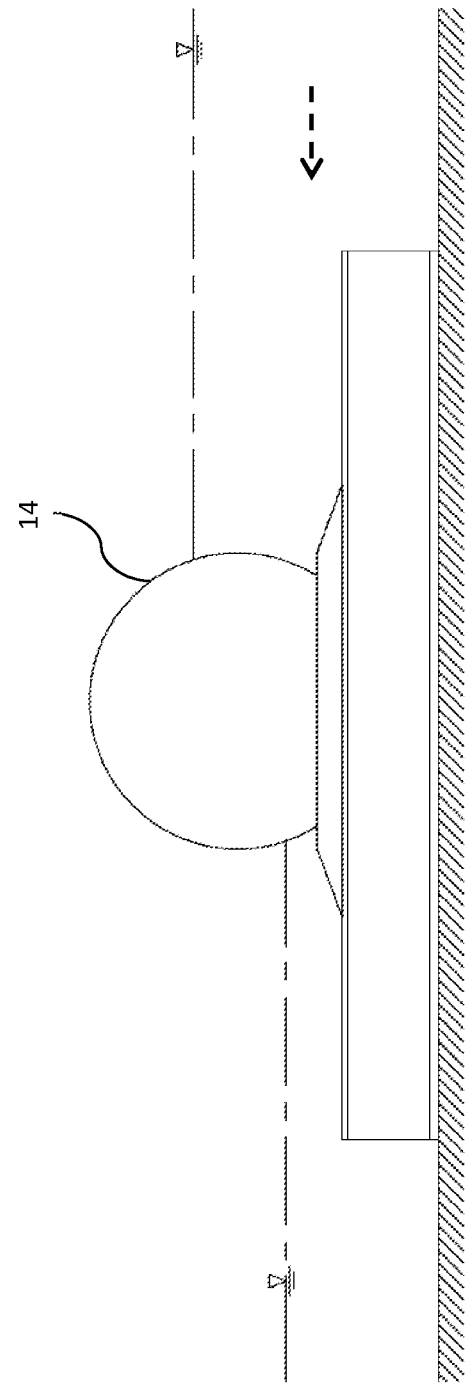
Figure 26C:
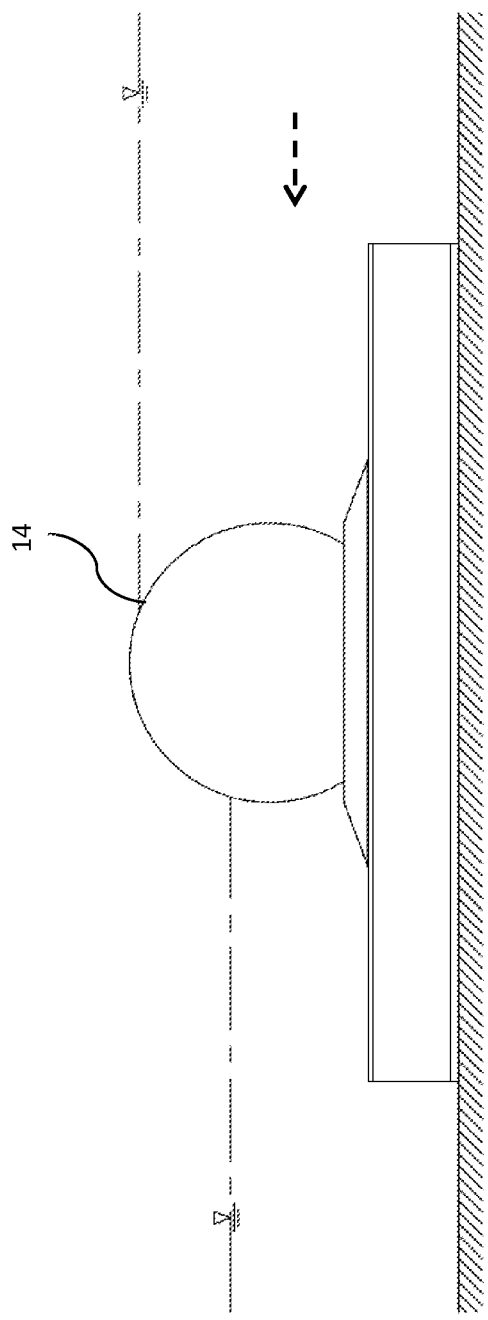
Figure 26D:
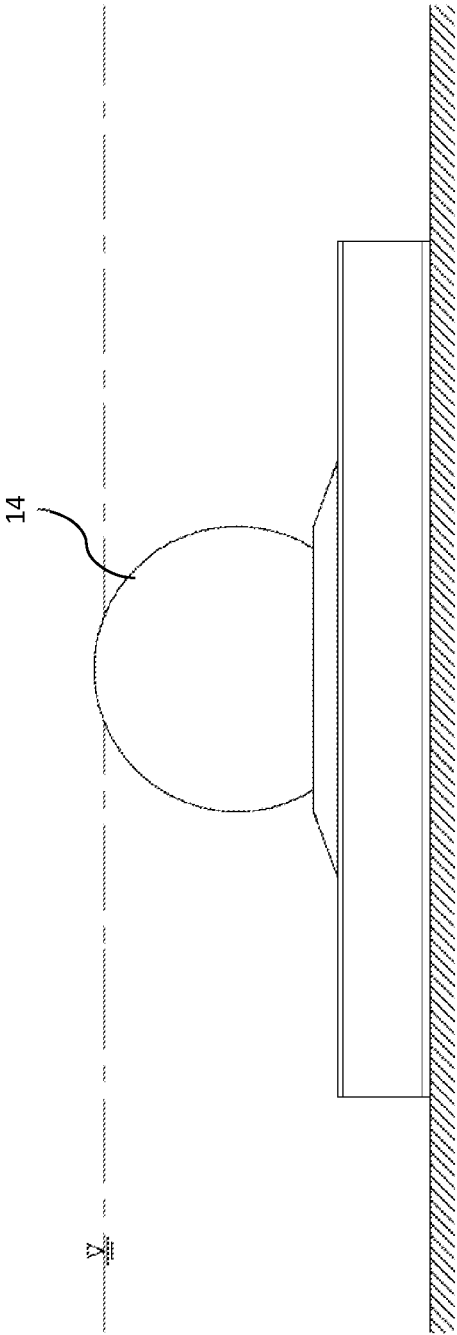

With reference to FIGS. 3 and 11 each primary flow pipe 20 comprises a first convergent section 26 that narrows from its opening 28 in a first end of the base structure towards a mixing chamber 30 which defines a venturi section. A second convergent section 32 narrows from its opening 34 at the second end of the base structure towards the second end of the mixing chamber 30. The mixing chamber comprises openings 36 to receive water from the adjacent secondary flow pipes.

Both the first and second convergent sections are configured as diffusers. When water is flowing thorough the primary flow pipe in a first direction 38 water enters the primary flow pipe via opening 28 into the first convergent section 26, and the second convergent section 32 is the diffuser section.

When water is flowing thorough the primary flow pipe in a second direction 40 water from the body of water enters the primary flow pipe via opening 34 into the second convergent section and the first convergent section is the diffuser section.

Figure 2:
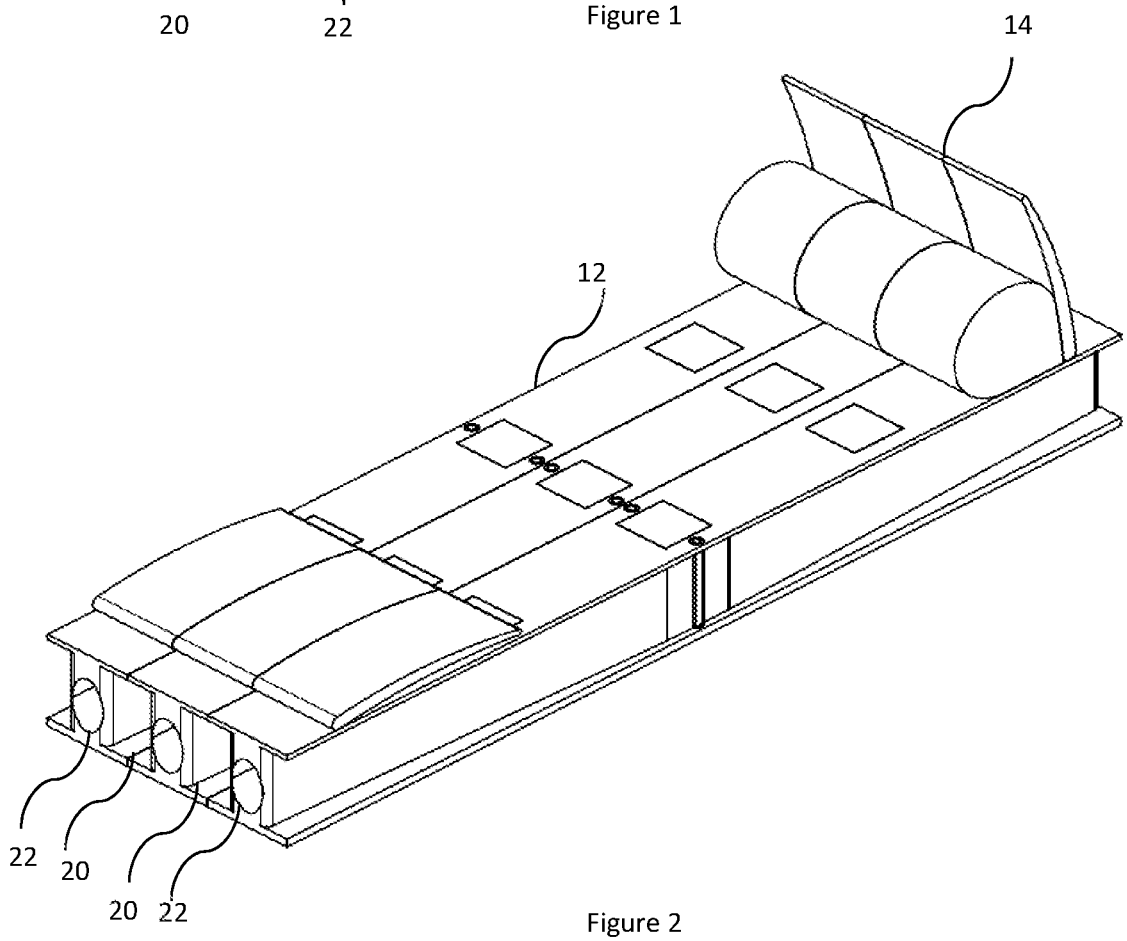
Figures 6, 7:
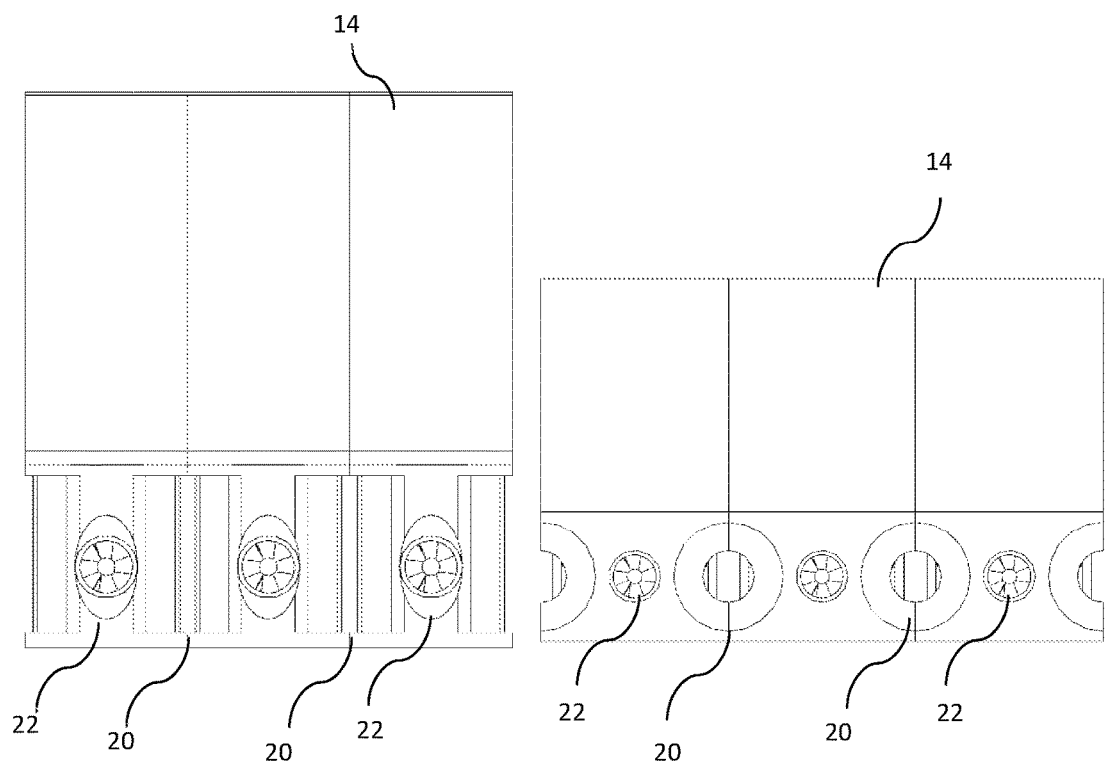
FIGS. 6 and 7 show front views of the invention.

As shown in the FIGS. 1, 2 and 6 the convergent and diffuser sections, have a substantially rectangular cross sectional shape. The side walls of the diffuser and convergent sections of the primary flow pipe are substantially vertical, with the convergent sections 26, 32 expanding in the vertical plane towards the openings 28, 34 of the pipe. As shown in FIGS. 3 and 7, the convergent sections 26, 32 can have substantially circular cross sections, which diverge in the direction of the pipe opening.

Figure 5:
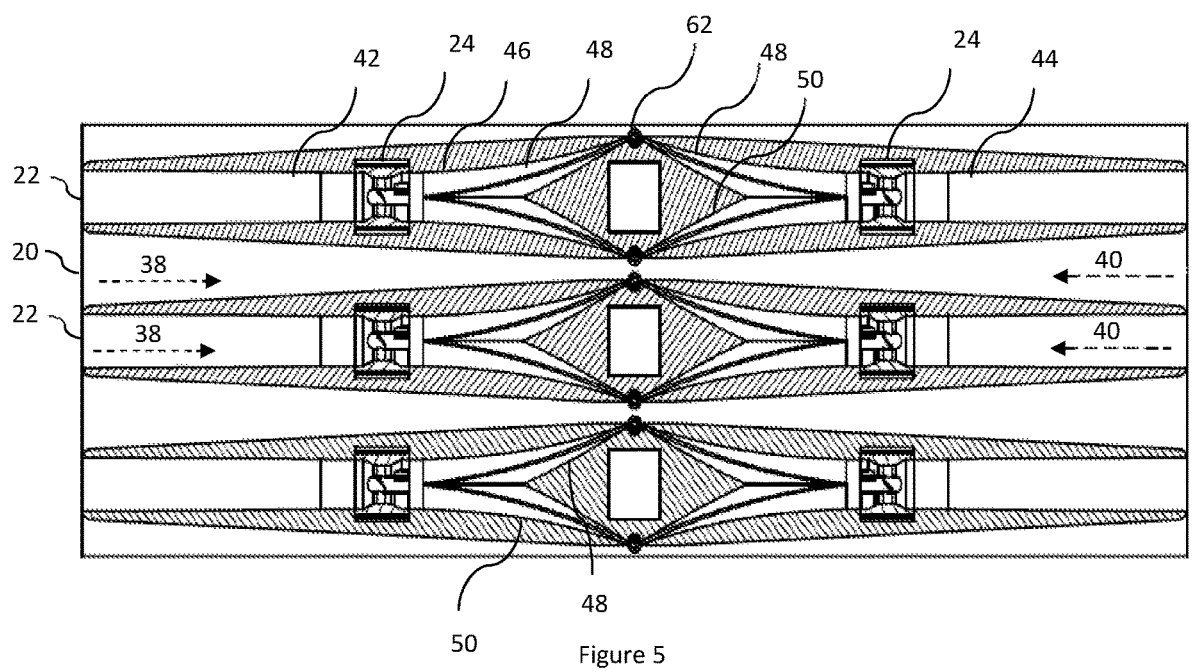
FIG. 5 shows a sectional top view of the invention.
Figure 10:
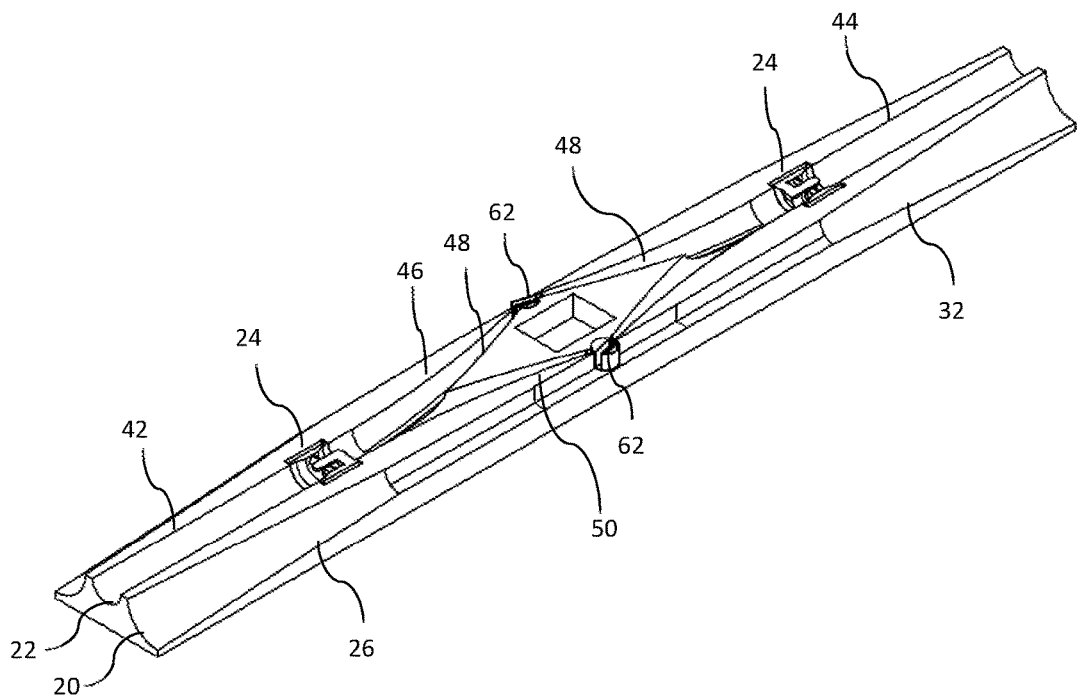
FIG. 10 shows a cut away schematic view of the invention.

Referring to FIGS. 5 and 10 the secondary flow pipes 22 are located substantially parallel to the primary flow pipes 20. Each secondary flow pipe comprises two turbines 24 located at opposite ends of the pipe. A first turbine is located in the upstream section 42 of the secondary flow pipe. A second turbine is located in the downstream section 44 of the secondary flow pipe. The blades of the turbine rotate about the substantially horizontal axis of the turbine. The turbines are connected to a generator (not shown). The turbines can be connected to the same or different generators. Rotation of the turbines drives the generator thus producing useful power.

A central section 46 is located between the two turbine containing upstream and downstream sections 42, 44. The secondary flow pipe connected to the primary flow pipe so as to be in fluid communication with the adjacent primary flow pipes via the central section.

The secondary flow pipe is provided with a single flow passage in the upstream 42 and downstream 44 sections and two flow passages in the central section.

In the central section the secondary flow pipe is split into a first flow channel 48 and a second flow channel 50. The first flow channel and a second flow channels each comprise an opening 52 that allows the secondary flow pipe to be in fluid communication with the adjacent primary flow pipe.

Figure 9:
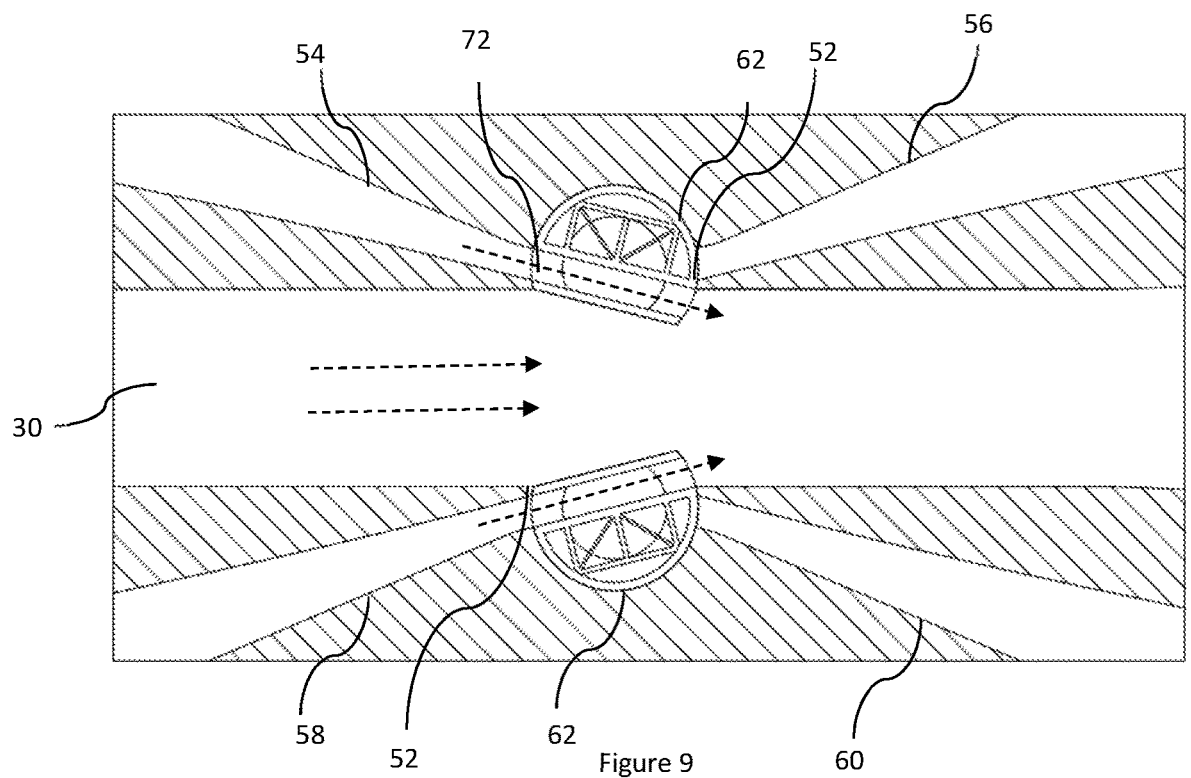
FIG. 9 shows a section view of part of the invention.

With reference to FIGS. 5, 9 and 10 the first flow channel is in fluid communication with a first primary flow pipe located on a first side of the secondary flow pipe and the second flow channel is in fluid communication with a second primary flow pipe located on a second side of the secondary flow pipe, such that the secondary flow pipe is in fluid communication with two primary flow pipes, located on opposite sides of the secondary flow pipe. However the secondary flow pipe located at the edge of the base structure will only feed water into one primary flow pipe.

The first flow channel is directed away from the central axis of the secondary flow pipe towards an opening of the primary flow pipe. The second flow channel is directed away from the central axis of the secondary flow pipe towards an opening of the primary flow pipe, and in a direction opposite the first flow channel. Openings in the first and second flow channels provide fluid communication with the adjacent primary flow pipes.

The upstream section 54 of the first flow channel diverts water from the upstream section of the secondary flow pipe at an angle away from the central axis of the secondary flow pipe. The downstream section 56 of the first flow channel diverts water from the downstream section of the secondary flow pipe at an angle away from the central axis of the secondary flow pipe. The upstream 54 and downstream 56 sections of the first flow channel 48 join at an opening 52.

The upstream section 58 of the second flow channel diverts water from the upstream section of the secondary flow pipe at an angle away from the central axis of the secondary flow pipe, and in a direction opposite the upstream section of the first flow channel. The downstream section 60 of the second flow channel diverts water from the downstream section of the secondary flow pipe at an angle away from the central axis of the secondary flow pipe and in a direction opposite the upstream section of the first flow channel. The upstream 58 and downstream 60 sections of the second flow channel 50 join at the opening 52.

A flow control mechanism 62 is located at the openings 52 of the first and second flow channels 48, 50. The flow control mechanism directs flow from the one side of the apparatus into the mixing chamber of the adjacent primary flow pipe and prevents water from flowing into the other section of the secondary flow pipe. The flow control mechanism can move between two positions, depending on the direction of the flow through the apparatus.

In a first position as shown in FIGS. 5 and 9 the flow control mechanism directs flow from the first (upstream) section 42 of the apparatus into the mixing chamber 30 of the adjacent primary flow pipe 20 and effectively blocking water from flowing into the second (downstream) section 44 of the secondary flow pipe. When the water is flowing in the opposite direction the flow control mechanism can be moved into a second position (not shown). In a second position the flow control mechanism directs flow from the second section of the apparatus into the mixing chamber of the adjacent primary flow pipe and effectively blocks water from flowing into the first section of the secondary flow pipe.

The flow control mechanism can be in the form of a baffle. The baffle can rotate depending on the direction of the water flowing through the apparatus.

Figure 8:
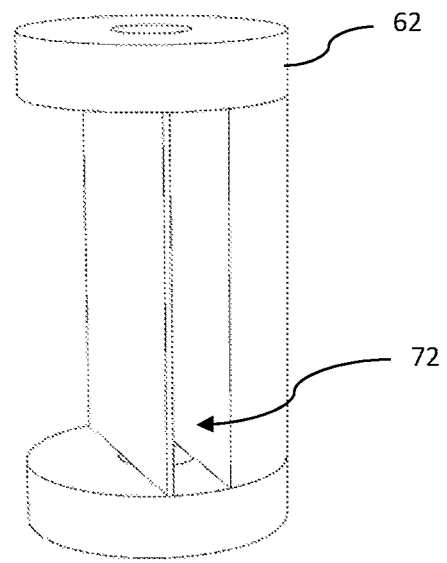
FIG. 8 shows an example of a flow control mechanism for use with the invention.

With reference to FIG. 8 the flow control baffle can have a substantially circular cylinder shape comprising a channel 72 that in use can direct water flow from the secondary flow pipe into the primary flow pipe.

In the first position the first end of the baffle channel 72 aligns with the upstream (first) section 54, 58 of the flow channels 48, 50, and the second end of the baffle channel 72 is directed to the opening of the mixing channel, such that water can flow from the first section 42 of the secondary flow pipe into the baffle channel and then into the mixing chamber. Water is prevented from flowing into the downstream (second) sections 56, 60 of the flow channels 48, 50 and into the second section 44 of the secondary flow pipe.

In the second position (not shown), when water if flowing in the opposite direction, the second end of the baffle channel aligns with the downstream (second) 56, 60 end of the flow channels, and the first end of the baffle channel is directed to the opening of the mixing chamber such that water can flow from the second section 44 of the secondary flow pipe into the baffle channel and then into the mixing chamber. Water is prevented from flowing into the upstream (first) sections 54, 58 of the flow channels 48, 50 and into the first section 42 of the secondary flow pipe.

The turbines located in the secondary flow pipe, can be any suitable turbine used in the generation of the electricity from water flow. For example turbines that can be used include propeller and Kaplan type turbines.

A further embodiment of the invention is shown in FIGS. 13-18. This embodiment of the invention comprises a base structure 12 having an array of primary flow pipes 20 and an array of secondary flow pipes 22. Each primary flow pipe 20 is located in between one secondary flow pipe 22 and another primary flow pipe 20. The primary flow pipes provide a flow passage from an upstream location to a location downstream of the barrier. The secondary flow pipe feeds flow into the primary flow pipe. A barrier (not shown) is located across the width of the base structure 12. Each primary flow pipe 20 is connected to one secondary flow pipe, such that water can flow from the secondary flow pipe into the primary flow pipe.

Both the primary and secondary flow pipes receive water from the body of water. The water exiting the primary flow pipes is a mixed flow of water that has entered the apparatus via both the primary flow pipes and secondary flow pipes.

With reference to FIG. 15 each primary flow pipe comprises a first convergent section 26 that narrows from its opening 28 in a first end of the base structure towards a mixing chamber 30 which defines a venturi section. A second convergent section 32 narrows from its opening 34 at the second end of the base structure towards the second end of the mixing chamber.

The mixing chamber comprises openings 36 to receive water from the adjacent secondary flow pipe. Plenum chambers 64a and 64b extend either side of the mixing chamber 30 into the base structure. The mixing chamber receives the secondary flow from the secondary flow pipe via the plenum chambers 64a and 64b.

Both the first and second convergent sections are configured as diffusers. When water is flowing thorough the primary flow pipe in a first direction 38 water enters the primary flow pipe via the first convergent section 26 and the second convergent section 32 is the diffuser section.

When water is flowing thorough the primary flow pipe in a second direction 40, water enters the primary flow pipe via the second convergent section 32 and the first convergent section 26 is the diffuser section.

The convergent sections, have a substantially rectangular cross sectional shape. The side walls of the diffuser and convergent sections of the primary flow pipe are substantially vertical, with the convergent sections expanding in the vertical plane.

The secondary flow pipes are located substantially parallel to the primary flow pipes. Each secondary flow pipe comprises two turbines located at opposite ends of the pipe. A first turbine is located in the upstream section 42 of the secondary flow pipe. A second turbine is located in the downstream section 44 of the secondary flow pipe. The blades of the turbine rotate about the substantially horizontal axis of the turbine. The turbines are connected to a generator (not shown). The turbines can be connected to the same or different generators. Rotation of the turbines drives the generator producing useful power.

Referring to FIGS. 16 and 17 a central section 46 of the secondary flow pipe is located between the two turbine containing upstream and downstream sections 42, 44. The secondary flow pipe is in fluid communication with an adjacent primary flow pipe via the central section.

In a central section the secondary flow pipe is split into a first flow channel 48 and a second flow channel 50. The first flow channel and second flow channel each comprise an opening that allows the secondary flow pipe to be in fluid communication with the adjacent primary flow pipe via the plenum chambers 64a and 64b.

The first flow channel and the second flow channel are in fluid communication with the same primary flow pipe. The first flow channel is in fluid communication with the primary flow pipe via the first plenum chamber. The second flow channel is in fluid communication with the primary flow pipe via the second plenum chamber.

The first flow channel is directed vertically up and across from the central axis of the secondary flow pipe towards the first plenum chamber. The second flow channel is directed vertically down and across from the central axis of the secondary flow pipe towards the second plenum chamber, and in a direction opposite the first flow channel. Openings 52 in the first and second flow channels provide fluid communication with the adjacent primary flow pipes via the first and second plenum chambers 64a and 64b.

The upstream section 54 of the first flow channel diverts water from the upstream section of the secondary flow pipe in a direction away from the central axis of the secondary flow pipe. The downstream section 56 of the first flow channel diverts water from the downstream section of the secondary flow pipe in a direction away from the central axis of the secondary flow pipe. The upstream and downstream sections of the first flow channel join at the opening with the plenum chamber 64a.

The upstream section 58 of the second flow channel diverts water from the upstream section of the secondary flow pipe away from the central axis of the secondary flow pipe, and in a direction opposite the upstream section of the first flow channel. The downstream section 60 of the second flow channel diverts water from the downstream section of the secondary flow pipe away from the central axis of the secondary flow pipe and in a direction opposite the upstream section of the first flow channel. The upstream and downstream sections of the second flow channel join at the opening 52 with the plenum chamber 64b.

Flow control mechanisms direct the water flow from the first and second flow channels into the plenum and prevent water flow into the downstream side of the first and second flow channels, such that all the water in the secondary flow pipe is discharged into the primary flow pipe.

The flow control mechanism allows water from the secondary flow pipe to pass into one or more of the plenum chamber 64a and/or the plenum chamber 64b. The water is then discharged over the entire width of the opening of the plenum chamber into the mixing chamber of the primary flow pipe. Water is discharged from the top plenum chamber 64a into the top of the mixing chamber and from the lower plenum chamber 64b into the bottom of the mixing chamber. The secondary flow mixes from the outside edges of the primary flow in the mixing chamber before the flow is discharged into the diffuser section and out the pipe.

The flow control mechanism directs flow into the mixing chamber. The low pressure in the plenum prevents flow bypassing into the downstream side of the secondary flow pipe. Flow is prevented from being drawn in from the downstream secondary flow pipe intake and recirculating through the device, either passively, or from separate flow control at the secondary flow pipe intake at the downstream intake end of the pipe. Passive control is achieved geometrically. The diameter of the secondary flow pipe can be designed to provide a certain water velocity that will ensure no static pressure gradient exists along the secondary flow pipe and hence no flow is drawn through from the downstream water level. The geometry is such that the flow is accelerated through the upstream section 42 of the secondary flow pipe, to a specific velocity that reduces the static pressure at the upstream flow channels 54 and 58 to that of the pressure in the downstream water level.

In a further embodiment a flow control mechanism is located at the openings of the first and second flow channels of the secondary flow pipe. The flow control mechanism directs flow from one side of the apparatus into the mixing chamber of the adjacent primary flow pipe and prevents water from flowing into the other section of the secondary flow pipe. The flow control mechanism can move between two positions, depending on the direction of the flow.

In a first position the flow control mechanism directs flow from the first (upstream) section 42 of the apparatus into the plenum chambers 64a and 64b and mixing chamber 30 of the adjacent primary flow pipe 20 and blocks water from flowing into the second (downstream) section 44 of the secondary flow pipe. When water is flowing in the opposite direction the flow control mechanism can be moved into a second position. In the second position 44 the flow control mechanism directs flow from the second section of the apparatus into the plenum chambers 64a and 64b and mixing chamber 30 of the adjacent primary flow pipe and blocks water from flowing into the first section 42 of the secondary flow pipe 20.

A flow control baffle can be used in the secondary flow pipe to direct flow into the mixing chamber. A flow control mechanism is located at the openings of the first and second flow channels. The flow control mechanism directs flow from the one side (upstream) of the apparatus into the mixing chamber of the adjacent primary flow pipe and prevents water from flowing into the other section (downstream) of the secondary flow pipe. The flow control mechanism can move between two positions, depending on the direction of the flow.

Referring to FIG. 15 horizontal flow control baffles 66 are positioned across the opening of the plenum chambers 64a and 64b to direct water into the mixing chamber 30. The horizontal flow control baffles can pivot about a central axis to control the direction the water is discharged into the mixing chamber. The horizontal flow control baffles can be moved between two positions such that the discharge of the water from the plenum chamber into the mixing chamber is in the direction of the flow of water through the apparatus.

By way of example, when water is flowing into the apparatus in a first direction 38, the horizontal flow control baffles can be moved to a first position such that the flow of water from the plenum chamber is discharged into the mixing chamber in the first direction to mix with the primary flow flowing through the apparatus in the same direction. When the water is flowing into the apparatus in a second direction the horizontal flow control baffles can be moved into a second position such that the flow of water from is discharged from the plenum chamber into the mixing chamber in the second direction to mix with the primary flow flowing through the apparatus in the same direction.

The baffle directs the flow from the secondary flow pipes along the top and bottom faces of the mixing chamber with the main primary flow occupying the central area of the mixing chamber.

The baffles are separate from the flow control at the inlet of the secondary flow pipes, and are for directing flow in the mixing chamber. When the baffles are positioned in a third position they can prevent flow from the plenum chamber into the primary flow pipe. For example when the baffles are positioned substantially horizontally they can stop all flow from the secondary flow pipe into the primary flow pipe.

A further embodiment of the invention is shown in FIG. 19-24. In this embodiment of the invention the apparatus comprises a base structure 12 having an array of primary flow pipes 20 and an array of secondary flow pipes 22. The horizontal array of primary flow pipes is located below the horizontal array of secondary flow pipes. The primary flow pipes provide a flow passage from an upstream location to a location downstream of the barrier. Each primary flow pipe is connected to one secondary flow pipe. The secondary flow pipe feeds water flow into the primary flow pipe located above it. A barrier extends across the width of the base structure. As shown in FIGS. 19-24 each primary flow pipe 20 is connected to one secondary flow pipe, such that water can flow from the secondary flow pipe into the primary flow pipe.

Both the primary and secondary flow pipes receive water from the body of water. The water exiting the primary flow pipes is a mixed flow of water that has entered the apparatus via both the primary flow pipes and secondary flow pipes. Each primary flow pipe comprises a first convergent section 26 that narrows from its first opening 28 in a first end of the base structure towards a mixing chamber 30 which defines a venturi section. A second convergent section 32 narrows from a second opening 34 at the second end of the base structure towards the second end of the mixing chamber 30. The mixing chamber comprises an opening to receive water from the adjacent secondary flow pipe.

Both the first and second convergent sections are configured as diffusers. When water is flowing through the primary flow pipe 20 in a first direction 38 water enters the primary flow pipe via the first convergent section 26 and the second convergent section 32 is the diffuser section.

When water is flowing through the primary flow pipe in a second direction 40 water enters the primary flow pipe via the second convergent section 32 and the first convergent section 26 is the diffuser section.

The convergent sections 26, 32, have a substantially rectangular cross sectional shape. The side walls of the convergent sections of the primary flow pipe are substantially vertical, with the convergent sections expanding in the vertical plane from the mixing chamber.

The secondary flow pipe is in fluid communication with the primary flow pipe via its central section. The secondary flow pipes 22 are located substantially parallel to the primary flow pipes 20 and manifold 68 connects the secondary flow pipe 22 to the primary flow pipe 20 located above. The manifold 68 allows the secondary flow pipe to be in fluid communication with its above primary flow pipe. The manifold extends from a central section of the secondary flow pipe to the primary flow pipe.

A turbine is located in the manifold and connected to a generator (not shown). The blades of the turbine are rotatable around a substantially vertical axis. The turbine can be for example a propeller or Kaplan turbine.

The secondary flow pipe comprises a flow control mechanism which can be moved between a first and second position to direct water into the manifold and through the turbine into the mixing chamber and prevent water from flowing all the way through the secondary flow pipe and exiting via the downstream section of the secondary flow pipe. The flow control mechanism can be in the form of an open ended drum having an open side, and a closed side. The open side receives water from the secondary flow pipe into the drum. The closed side effectively blocking off water flow through the length of the secondary flow pipe and directing water through the open end of the drum into the mixing chamber of the primary flow pipe. The drum can extend through the manifold to the mixing chamber opening, providing a flow passage from the secondary flow to the primary flow pipe.

The flow control mechanism can move between two positions, depending on the direction of the flow. In a first position the flow control mechanism directs flow from the first (upstream) section of the apparatus into the manifold and effectively blocks water from flowing into the second (downstream) section of the secondary flow pipe. When the water is flowing in the opposite direction the flow control mechanism can be moved into a second position. In the second position the flow control mechanism directs flow from the second section of the apparatus into the manifold and effectively blocks water from flowing into the first section of the secondary flow pipe. In this second position the second section will now be the upstream section, and the first section will be the downstream section.

A moveable shroud forms a plenum chamber 70 in the mixing chamber about the mixing chambers opening with the manifold comprising the turbine. The flow of water from the secondary flow pipe is drawn into the plenum chamber after flowing through the turbine in the manifold. The shaft of the turbine extends through the plenum chamber to a generator (not shown).

The moveable plenum chamber is centrally located in the mixing chamber such that water flow through the primary flow pipe can flow around the sides of the plenum chamber. The plenum chamber has an opening in the form of slot, through which water received from the secondary flow pipe is discharged to mix with the primary water flow flowing through the primary flow pipe. The plenum chamber is rotatable such that the opening of the plenum chamber can be located so the flow from the plenum is discharged into the center of the primary flow. The plenum chamber comprises external baffles 74 on the opposite side to the opening. The external baffles 74 are triangular shaped and direct water around the sides of the plenum chamber 70.

The flow control mechanism is connected to the plenum chamber located in the mixing chamber and the plenum chamber can rotate when the flow control mechanism moves between its first and second position.

The flow control mechanism includes the shroud that forms the plenum and the external baffles. The drum can extend into the mixing chamber, the top of the drum configured as the plenum chamber having an opening to release water into the mixing chamber. The whole mechanism rotates between the first and second positons. The open sided drum is connected to the plenum so that rotation of the drum rotates the plenum. In the first position the open side of the drum faces a first direction and the opening of the plenum chamber into the primary flow passage faces a second direction. In a second position the open side of the drum faces a second direction and the opening of the plenum chamber into the primary flow passage faces a first direction.

As shown in FIG. 23 the turbine can be located in the manifold portion of the drum. The turbine rotates independently from the drum and the plenum chamber as water flows through.

The apparatus are particularly useful in shallow water environments. Where there is only a single horizontal array of pipes, for example as shown in FIGS. 1-18, the apparatus can be used without major bed excavation on large infrastructure projects in water depths down to half a meter or less depending on the size of pipes and turbines used. Where there are two horizontal array of pipes, one array located above the above, for example as shown in FIGS. 19-24, the apparatus can be used without major bed excavation on large infrastructure projects in water depths of one metre or less depending on the size of the pipes and turbines.

Where the river or sea bed can be lowered and profiled by excavation local to the alignment of the apparatus there is no water depth limitation. Multiple arrays of the primary and secondary flow pipes can be used. The number of pipes in each array will depend on the size of body of water that the apparatus is to be used in. Each apparatus could comprise only two or three pipes, the base structure comprising a secondary and primary flow pipe arrangement. Preferably the base structure comprises an array of secondary and primary flow pipe arrangements, for example 4, 5, 6, 7, 8, 9, 10 or more primary and secondary flow pipes.

Although the convergent and diffuser sections are shown as having substantially circular or rectangular cross sections. Other shaped convergent/diffuser sections and mixing chamber and combination of shapes can be used. The secondary flow pipes can have substantially circular cross sections at their openings. However other shaped cross sections are also contemplated. The cross-sectional shape of the secondary flow pipes can change over the length of the flow passage. For example, the secondary flow path can transition from having a circular cross section at the openings of the secondary flow pipe to a rectangular cross section in the secondary flow channels in the central region.

The pipes are configured, i.e., by their size and shape, such that approximately 80% of the volume of the water entering the apparatus will flow into the primary flow pipes and approximately 20% of the volume of the water entering the apparatus will enter into the secondary flow pipes. 100% of the volume of water that enters the apparatus exits the apparatus via the primary flow pipes.

With reference to FIGS. 1, 12, 19, 20, 23 and 25 the system comprises two moveable barriers located on the top surface of the base structure. The barriers extend orthogonally to the central axis of the primary and second pipes, across the base structure. A first moveable barrier is located at the first end of the base structure. The second moveable barrier is located at the opposite end of the base structure.

Each of the moveable barriers can move between a first raised position and a second lowered position. In the raised position the barrier blocks the water from flowing over the top of the apparatus and creates a head difference from the upstream and downstream side of the barrier. The water is instead directed through the array of pipes. The pipes providing a flow passage for the water through the base structure from the upstream side of the barrier to the downstream side of the barrier. In the lowered position the water can flow over the top of the barrier and base structure.

When water flows from a first direction the first moveable barrier located on the upstream end of the base structure is raised, and the second moveable barrier located on the downstream end of the base structure is lowered. When water flows from a second direction the second moveable barrier located on the downstream end of the base structure is raised, and the first moveable barrier located on the upstream end of the base structure is lowered.

Although embodiments of the present invention have been described as comprising two moveable barriers, one at each end of the base structure, the system may also comprise one barrier.

The moveable barriers can for example be inflatable barriers and/or hydraulically operated weir plates or gates. The moveable barrier extends across the width of the base structure.

When inflatable barriers are used, rubber balloons may be attached to the edges of the concrete base structure. The balloons can be filed with a fluid, such as water or gas to raise the barrier. When the barrier is to be lowered the fluid can be released from the balloon. Examples of inflatable barriers are those supplied by Dyrhoff UK Ltd, see for example GB2521876. Other barriers can comprise tubular inflatables used with hinged gates. Inflatable tubulars are located one side of the gates. Inflation of the tubular components raises the gates, deflating of the tubular components lowers the gates.

By providing the system with moveable barriers, the barriers can be lowered when not in use and improve the appearance of the environment. Although the system is described with reference to moveable barriers, fixed barriers could be used instead, for example a concrete wall, located across the width of the base structure. Although the system is discussed as having a barrier at each end section of the base structure or a single barrier across the central section of the base structure, each barrier that extends across the width of the base structure can be comprised of separately aligned components. For example multiple, i.e., one, two, three or more, hydraulically or inflatably actuated gates or weir plates may be aligned across the width of the base to form one barrier.

The system can be used as shown in FIG. 25. At low tide the water level on both sides of the system may be below the base structure and the barriers are both lowered (FIG. 25a). On an incoming tide, the downstream barrier is raised to maintain the preferred head difference as the tide comes in (FIGS. 25b-c). At high tide (FIG. 25d) the downstream barrier is lowered and the upstream barrier is raised ready for the next tidal cycle. The upstream barrier remains raised as the tide goes out until the preferred head difference is established (FIG. 25e). As the tide continues to go out the upstream barrier is lowered to maintain the preferred head difference, until full lowered (FIG. 25f). With both barriers now lowered at low tide the system is ready for the next tidal cycle. As a head difference can be established on both an incoming and outgoing tide, the system can be used to generate electricity from tidal flows in both directions.

When water is flowing from a first direction 38, for example an incoming tide, the first barrier is raised. The barrier across the body of water provides a head difference between the first (upstream) side of base structure and the second (downstream) side of the base structure. Water from the first (upstream) side of the barrier flows through the primary flow pipes. A primary water flow enters the first (convergent) section and flows into the mixing chamber and then out of the second convergent (diffuser) section. A secondary flow through the secondary flow pipes is induced, and water flows through the first section of the secondary flow pipes into the primary flow pipes, which drives rotation of the turbine generating electricity via a mechanical or electrical power off take arrangement.

When the flow of the water reverses, and flows in the second direction 40, for example on an outgoing tide, the second barrier is raised and the first barrier can be lowered. The barrier across the body of water provides a head difference between the second end of the base structure and the first end of the base structure. Water from the second side of the barrier flows through the primary flow pipes. A primary water flow enters the second (convergent) section and flows into the mixing chamber and then out of the first convergent section (now acting as the diffuser section). A secondary flow through the secondary flow pipes is induced, and water flows through the second section of the secondary flow pipes into the primary flow pipes, which drives rotation of the turbine generating electricity via a mechanical or electrical power off take arrangement.

FIG. 26 exemplifies a system according to some embodiments of the invention comprising a fixed barrier. As shown in FIGS. 26a-f a barrier is located across the base structure and maintains head difference between the upstream and downstream sides of the base structure during the incoming tides, FIGS. 26b and c, and outgoing tides, FIGS. 26e and f.

A low pressure zone at the venturi of the primary flow pipe induces the secondary flow through the secondary flow pipe, into the primary flow pipe. Both the primary and secondary water flows enter the mixing chamber where the two flows can mix. The mixed flow enters the diffuser section (first or second convergent section depending on the direction of flow) and the velocity of the water flow slows as it moved through the diffuser section. As water flow through the diffuser section the flow regains it static head and loses its dynamic head before it exits the diffuser section downstream. This preserves the low static head in the venturi.

Thus the system is able to generate electricity from water flow in two directions. For example the system may be used as a tidal barrage across a tidal river or estuary. The systems are particularly suitable for use in environments where only a low head difference is possible to obtain.

The system also enables the shape of the tidal signal to be preserved, whilst generating electricity from a tidal flow. The system does not stop the flow of water, as in a conventional tidal-head or tidal-range device, as the water can continue to flow through the device during the incoming and out-going tides despite the presence of the barriers to maintain the head difference.

In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An apparatus for use in generating electricity from a bidirectional water flow, comprising:

a base structure;
a primary flow pipe defining a first flow passage through the base structure; and
a secondary flow pipe defining a second flow passage through the base structure, wherein the first and second flow passages are configured for bidirectional flow;
the primary flow pipe comprising:
   a convergent section;
   a mixing chamber, the convergent section being connected to a first end of the mixing chamber to define a venturi therebetween; and
   a diffuser section connected to a second end of the mixing chamber;
the apparatus further comprising:
   an opening in the secondary flow pipe arranged to provide fluidic communication between the second flow passage and the mixing chamber;
   a turbine connectable to a generator and arranged to be rotated by water flow from the second flow passage; and
   a flow control mechanism for directing the water flow from the second flow passage through the opening into the mixing chamber, where water flowing from a first direction flows into the mixing chamber from one end of the base structure and water flowing from a second direction flows into the mixing chamber from the opposite end of the base structure, and where the flow control mechanism is configured to block the water flow through an entire length of the second flow passage and is configured to control the direction of the water flow so that all water entering the primary and secondary flow pipes discharges via the primary flow pipe.

2. The apparatus according to claim 1, further comprising a plurality of primary flow pipes and a plurality of secondary flow pipes, wherein each primary flow pipe is located adjacent at least one secondary flow pipe.

3. The apparatus according to claim 2 wherein the secondary flow pipes are located to the sides of the primary flow pipes to form a horizontal array of primary and secondary flow pipes, and wherein each secondary flow pipe comprises two turbines, a first turbine located in a first end of the secondary flow pipe and a second turbine located in a second end of the secondary flow pipe.

4. The apparatus according to claim 2 wherein the secondary flow pipe comprises a central section located between the first and second ends of the secondary flow pipe, wherein in the central section of the secondary flow pipe comprises a first flow channel and a second flow channel, and wherein the first and second flow channels are in fluidic communication with the mixing chamber of at least one of the primary flow pipes.

5. The apparatus according to claim 4 wherein the first flow channel and the second flow channel of each secondary flow pipe are in fluid communication with the same primary flow pipe.

6. The apparatus according to claim 5, further comprising a first plenum chamber connecting the first flow channel to the top of the mixing chamber and a second plenum chamber connecting the second flow channel to the bottom of the mixing chamber of each primary flow pipe.

7. The apparatus according to claim 6 wherein the mixing chamber comprises moveable horizontal flow control baffles positioned to direct the flow of water from the plenum chambers into the mixing chamber.

8. The apparatus according to claim 4 wherein the first flow channel and the second flow channel are in fluid communication with different primary flow pipes.

9. The apparatus according to claim 8 wherein the first flow channel of the secondary flow pipe is configured to discharge water into the mixing chamber of a first primary flow pipe and the second flow channel of the secondary flow pipe is configured to discharge water into a second primary flow pipe.

10. The apparatus according to claim 2 wherein each primary flow pipe is in fluidic communication with two secondary flow pipes.

11. The apparatus according to claim 2 wherein each primary flow pipe is in fluidic communication with one secondary flow pipe.

12. The apparatus according to claim 2 wherein each secondary flow pipe is located below one of the primary flow pipes.

13. The apparatus according to claim 12, further comprising a manifold connecting the secondary flow pipe to the primary flow pipe located above, wherein the turbine is located in the manifold.

14. The apparatus according to claim 13 wherein the primary flow pipe comprises a moveable plenum chamber in the mixing chamber, and wherein the flow from the secondary flow pipe is drawn into the plenum chamber via the manifold.

15. The apparatus according to claim 14 wherein the moveable plenum chamber is located such that water flow through the primary flow pipe can flow around the sides of the plenum and having an opening in the direction of the flow, through which water from the secondary flow pipe is discharged.

16. The apparatus according to claim 14 wherein the moveable plenum chamber is moveable between a first position such that the opening of the plenum chamber is in a first direction of the flow and a second position such that the opening of the plenum chamber is in a second direction of the flow.

17. The apparatus according to claim 14 wherein the moveable plenum chamber is connected to the flow control mechanism such that movement of the flow control mechanism between first and second positions of the flow control mechanism moves the plenum chamber between first and second positions of the plenum chamber.

18. The apparatus according to claim 1 wherein the flow control mechanism is moveable between a first position in which water flows into the mixing chamber from one end of the base structure and a second position in which water flows into the mixing chamber from the opposite end of the base structure.

19. The apparatus according to claim 18 wherein the flow control mechanism is a moveable baffle.

20. The apparatus according to claim 19 wherein the movable baffle comprises a channel to direct water from the secondary flow passage into the primary flow passage.

21. The apparatus according to claim 1 wherein the flow control mechanism comprises a passive flow control mechanism.

22. The apparatus according to claim 21 wherein the flow control mechanism is structurally arranged such that there is no pressure gradient between each end of the secondary flow pipe.

23. A system for use in generating electricity from a bidirectional water flow, comprising:
   an apparatus including:
      a base structure;

a primary flow pipe defining a first flow passage through the base structure; and a secondary flow pipe defining a second flow passage through the base structure, wherein the first and second flow passages are configured for bidirectional flow;

the primary flow pipe comprising:
  a convergent section;
  a mixing chamber, the convergent section being connected to a first end of the mixing chamber to define a venturi therebetween; and
  a diffuser section connected to a second end of the mixing chamber:

the apparatus further comprising:
  an opening in the secondary flow pipe arranged to provide fluidic communication between the second flow passage and the mixing chamber;
  a turbine connectable to a generator and arranged to be rotated by water flow from the second flow passage; and
  a flow control mechanism for directing the water flow from the second flow passage through the opening into the mixing chamber, where water flowing from a first direction flows into the mixing chamber from one end of the base structure and water flowing from a second direction flows into the mixing chamber from the opposite end of the base structure, and where the flow control mechanism is configured to block the water flow through an entire length of the second flow passage and is configured to control the direction of the water flow so that all water entering the primary and secondary flow pipes discharges via the primary flow pipe; and
at least one barrier located across the top of the base structure.

24. The system according to claim 23, further comprising:
at least one moveable barrier located on the top of the base structure;
wherein the moveable barrier is moveable between a first raised position and a second lowered position.

25. The system according to claim 23, further comprising:
two moveable barriers;
wherein the first moveable barrier is located at the first end of the base structure and the second moveable barrier is located the opposite end of the base structure.

* * * * *